United States Patent
Xiang

(10) Patent No.: US 11,145,070 B2
(45) Date of Patent: Oct. 12, 2021

(54) IMAGE PROCESSING METHOD, TERMINAL, AND STORAGE MEDIUM

(71) Applicant: Tencent Technology (Shenzhen) Company Limited, Shenzhen (CN)

(72) Inventor: Xiaoming Xiang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 39 days.

(21) Appl. No.: 16/794,013

(22) Filed: Feb. 18, 2020

(65) Prior Publication Data

US 2020/0184655 A1 Jun. 11, 2020

Related U.S. Application Data

(63) Continuation of application No. PCT/CN2018/103487, filed on Aug. 31, 2018.

(30) Foreign Application Priority Data

Sep. 4, 2017 (CN) .......................... 201710787492.7

(51) Int. Cl.
G06T 7/246 (2017.01)
G06T 7/269 (2017.01)
H04N 1/047 (2006.01)

(52) U.S. Cl.
CPC .............. G06T 7/248 (2017.01); G06T 7/269 (2017.01); H04N 1/047 (2013.01)

(58) Field of Classification Search
CPC G06T 7/248; G06T 7/269; G06T 7/00; G06T 7/60; H04N 1/047; H04N 5/232
See application file for complete search history.

(56) References Cited

U.S. PATENT DOCUMENTS

2008/0199044 A1* 8/2008 Tsurumi ................. G06T 7/269
  382/103
2011/0234818 A1 9/2011 Sugihara

FOREIGN PATENT DOCUMENTS

CN 101527040 A 9/2009
CN 102043945 A * 5/2011
(Continued)

OTHER PUBLICATIONS

Extended European Search Report, EP18849906.5, dated Jan. 12, 2021, 8 pgs.

(Continued)

*Primary Examiner* — Charles T Shedrick
(74) *Attorney, Agent, or Firm* — Morgan, Lewis & Bockius LLP

(57) ABSTRACT

An image processing method is provided, including: extracting at least one image feature point from a target frame image captured by a camera; obtaining feature information of at least one optical flow image feature point in a previous frame image captured by the camera in a case that the target frame image is a valid frame image, and determining, in the at least one image feature point, an image feature point corresponding to the optical flow image feature point according to feature information of the at least one image feature point; calculating a displacement distance, in a frame image, between the optical flow image feature point in the previous frame image and the corresponding image feature point in the target frame image; and outputting the target frame image in response to determining according to the displacement distance that the target frame image is captured in a non-motion state.

17 Claims, 15 Drawing Sheets

(56) References Cited

FOREIGN PATENT DOCUMENTS

| CN | 102509285 | A | | 6/2012 | |
|----|-----------|---|---|--------|---|
| CN | 104917963 | A | | 9/2015 | |
| CN | 105007421 | A | | 10/2015 | |
| CN | 106713702 | A | | 5/2017 | |
| CN | 106851094 | A | | 6/2017 | |
| CN | 107610108 | A | | 1/2018 | |
| EP | 3275827 | A1 | * | 1/2018 | ............. G06T 7/194 |
| JP | 2013125341 | A | | 6/2013 | |
| JP | 2016081252 | A | | 5/2016 | |

OTHER PUBLICATIONS

Tencent Technology, ISRWO, PCT/CN2018/103487, dated Nov. 16, 2018, 8 pgs.

Wei, Xiang et al., "Initializing Cluster Method With Motion Of Grid's Center", Computer Engineering And Applications, Dec. 31, 2010, pp. 135-138, vol. 46, No. 13.

Tencent Technology, IPRP, PCT/CN2018/103487, dated Mar. 10, 2020, 6 pgs.

* cited by examiner

IMAGE PROCESSING METHOD, TERMINAL, AND STORAGE MEDIUM

CROSS-REFERENCE TO RELATED APPLICATIONS

This application is a continuation application of PCT/CN2018/103487, entitled "IMAGE PROCESSING METHOD, TERMINAL, AND STORAGE MEDIUM" filed on Aug. 31, 2018, which claims priority to Chinese Patent Application No. 201710787492.7, entitled "IMAGE PROCESSING METHOD AND APPARATUS" and filed with the China National Intellectual Property Administration on Sep. 4, 2017, all of which are incorporated by reference in their entirety.

FIELD OF THE TECHNOLOGY

This application relates to the field of image processing, and in particular, to an image processing method, a terminal, and a storage medium.

BACKGROUND OF THE DISCLOSURE

With the development of the related art of mobile devices, people use a mobile device to capture images such as photos more frequently. Because the mobile device is generally not stationary, the imaging effect of an image captured by a camera may be greatly affected by the motion of the mobile device during photographing. Images with a poor imaging effect are generally not satisfactory to the user. However, in the related art, such images with a poor imaging effect cannot be effectively identified.

SUMMARY

According to various embodiments of this application, an image processing method, a terminal, and a storage medium are provided.

The image processing method is performed at a terminal including memory and one or more processors, the method including:
  extracting at least one image feature point from a target frame image captured by a camera of the terminal;
  obtaining feature information of at least one optical flow image feature point in a previous frame image captured by the camera in a case that the target frame image is a valid frame image;
  determining, among the at least one image feature point, an image feature point corresponding to the optical flow image feature point according to feature information of the at least one image feature point;
  calculating a displacement distance between the optical flow image feature point in the previous frame image and the corresponding image feature point in the target frame image; and
  outputting the target frame image in response to a determination that the target frame image is captured in a non-motion state according to the displacement distance.

The terminal for image processing includes one or more processors, memory coupled to the one or more processors and a plurality of programs stored in the memory that, when executed by the one or more processors, cause the mobile terminal to perform the aforementioned image processing method.

The non-transitory storage medium stores a plurality of program instructions, the program instructions, when executed by one or more processors of a terminal, causing the one or more processors to perform the operations of the aforementioned image processing method.

Details of one or more embodiments of this application are provided in the accompanying drawings and descriptions below. Other features, objectives, and advantages of this application will become apparent from the specification, the accompanying drawings, and the claims.

BRIEF DESCRIPTION OF THE DRAWINGS

To describe the technical solutions in the embodiments of this application more clearly, the following briefly describes the accompanying drawings required for describing the embodiments or the related art. Apparently, the accompanying drawings in the following description show merely some embodiments of this application, and a person of ordinary skill in the art may derive other drawings from these accompanying drawings without creative efforts.

DESCRIPTION OF EMBODIMENTS

To make the objectives, technical solutions, and advantages of this application clearer, the following further describes this application in detail with reference to the accompanying drawings and the embodiments. It can be understood that the specific embodiments described herein are merely used to explain this application but are not intended to limit this application.

The embodiments of this application disclose an image processing method, a terminal, and a storage medium, which can avoid outputting an image with a poor imaging effect, and improving image processing efficiency of a terminal.

Figure 1A:
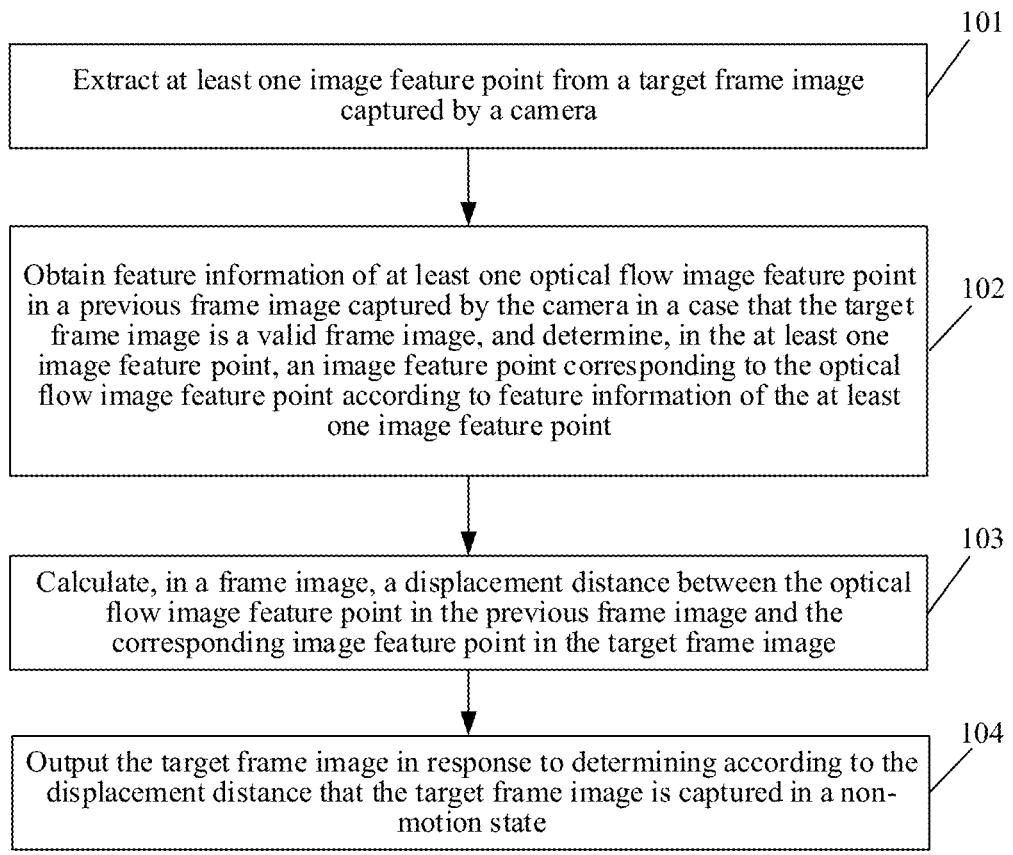
FIG. 1A is a schematic flowchart of an image processing method according to an embodiment of this application.

FIG. 1A is a schematic flowchart of an image processing method according to an embodiment of this application. As shown in FIG. 1A, the image processing method may include:

101. Extract at least one image feature point from a target frame image captured by a camera.

It can be understood that, this embodiment of this application may be applied to a terminal for image processing. The terminal may be a mobile phone, a tablet computer, a notebook computer, a palmtop computer, a mobile Internet device (MID), a wearable device (for example, a smartwatch (such as an iWatch)), or the like, which is not limited in the embodiments of this application.

In this embodiment of this application, the camera may be a camera in the terminal, or may be a camera externally connected to the terminal. In other words, in a case that the camera is a camera externally connected to the terminal, after a target frame image is captured by using the camera, the target frame image may be uploaded to the terminal, and processed by the terminal.

In this embodiment of this application, the image feature point may be extracted through an algorithm such as a scale-invariant feature transform (SIFT) algorithm, a speeded-up robust feature (SURF) algorithm, a features from accelerated segment test (FAST) algorithm, an improved SIFT algorithm, or an improved SURF algorithm. A specific algorithm for extracting an image feature point is not limited in the embodiments of this application.

102. Obtain feature information of at least one optical flow image feature point in a previous frame image captured by the camera in a case that the target frame image is a valid frame image, and determine, in the at least one image feature point, an image feature point corresponding to the optical flow image feature point according to feature information of the at least one image feature point.

Specifically, the feature information includes pixel color information or luminance information of the image feature point.

Specifically, the obtaining feature information of at least one optical flow image feature point in a previous frame image captured by the camera, and determining, in the at least one image feature point, an image feature point corresponding to the optical flow image feature point according to feature information of the at least one image feature point includes:

performing optical flow tracking on the optical flow image feature point according to the feature information of the optical flow image feature point in the previous frame image, and tracking in the target frame image according to the feature information of the at least one image feature point in the target frame image, to obtain the image feature point corresponding to the optical flow image feature point.

The concept of optical flow was firstly put forward by Gibson in 1950. The optical flow is an instantaneous speed of pixel motion of a space moving object on an observed imaging surface, and utilizes a change of pixels in an image sequence in a time domain and a correlation between adjacent frames to find a correspondence between a previous frame and a current frame. Therefore, in this embodiment, optical flow tracking is performed on the optical flow image feature point by using the feature information of the optical flow image feature point in the previous frame image, to obtain an image feature point, in the target frame image, corresponding to the optical flow image feature point. Feature information of the image feature point corresponding to the optical flow image feature point is the same as the feature information of the optical flow image feature point, or a similarity between the two pieces of feature information reaches a set threshold (for example, 98%). The feature information includes pixel color information or luminance information of the image feature point.

The performing optical flow tracking on the optical flow image feature point according to the feature information of the optical flow image feature point in the previous frame image includes: performing the optical flow tracking on the optical flow image feature point according to the feature information of the optical flow image feature point in the previous frame image in a case that the previous frame image captured by the camera is a valid frame image.

In this embodiment, in the process of performing the optical flow tracking according to the optical flow image feature point in the previous frame image, if an image feature point corresponding to a target optical flow image feature point cannot be obtained through tracking in the target frame image according to feature information of the target optical flow image feature point in the previous frame image, it indicates that the optical flow tracking fails, and the saved feature information of the target optical flow image feature point may be discarded.

103. Calculate a displacement distance, in a frame image, between the optical flow image feature point in the previous frame image and the corresponding image feature point in the target frame image.

In a case that it is determined that the target frame image is a valid frame image, the displacement distance, in the frame image, between the optical flow image feature point in the previous frame image and the corresponding image feature point in the target frame image may be calculated. In an optional embodiment, the image feature point, in the target frame image, corresponding to the optical flow image feature point in the previous frame image may be calculated through a pyramid optical flow algorithm, so that the displacement distance, in the frame image, between the optical flow image feature point in the previous frame image and the corresponding image feature point in the target frame image may be calculated. The pyramid optical flow algorithm roughly includes three steps: establishing a pyramid, pyramid tracking, and an iteration process. A pyramid feature tracking algorithm is as follows: firstly, calculating an optical flow and affine transformation matrix on the highest layer of an image pyramid; secondly transmitting a calculation result of the highest layer as an initial value to an image of a next layer, that is, on the basis of the initial value, calculating, by the image of the next layer, an optical flow and affine transformation matrix of the next layer; then transmitting the optical flow and affine transformation matrix of the next layer as an initial value to a next layer, until the value is transmitted to the last layer, that is, an original image layer; and finally, using an optical flow and affine transformation matrix calculated on the last layer as a final optical flow and affine transformation matrix result. The final optical flow is obtained through iteration, so that the image feature point, in the target frame image, corresponding to the optical flow image feature point in the previous frame image is calculated according to the iterated optical flow. It can be understood that, in other optional embodiments, other image tracking algorithms may also be used. For example, an improved pyramid optical flow algorithm is used to track a location of an image feature point, which is not limited in this embodiment.

Figure 1B:
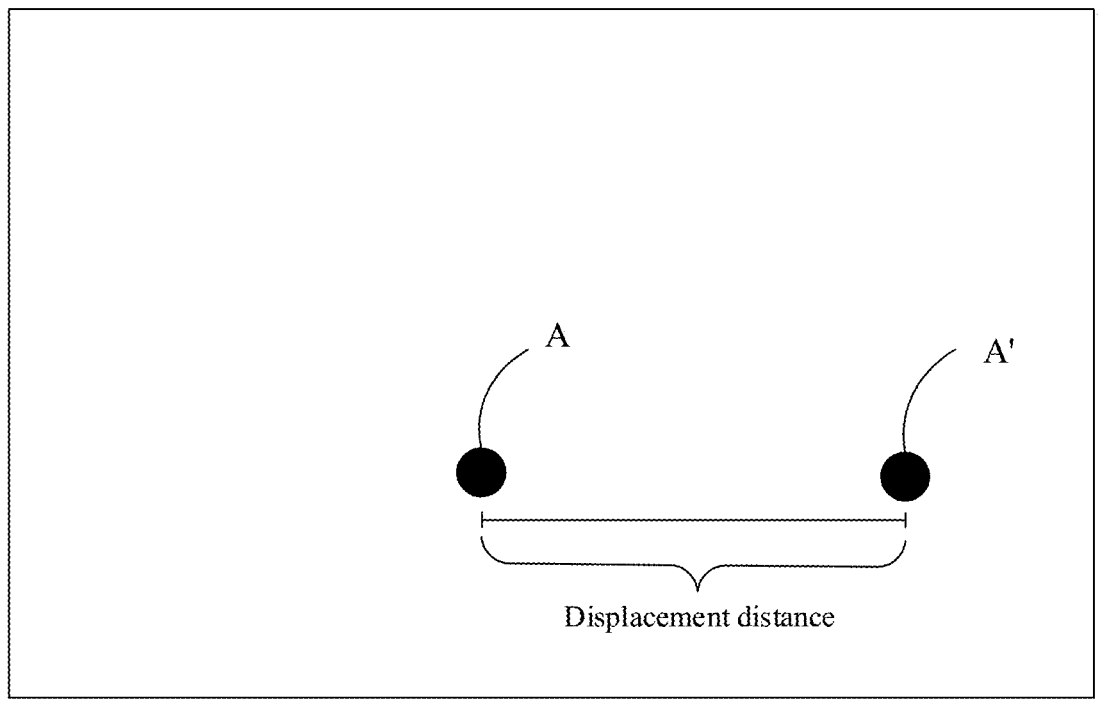
FIG. 1B is a schematic diagram of a scenario of a displacement distance according to an embodiment of this application.

FIG. 1B is a schematic diagram of a scenario of a displacement distance according to an embodiment of this application. As shown in FIG. 1B, a black dot A is an optical flow image feature point in a previous frame image, and a black dot A' is an image feature point that corresponds to A and that is tracked to a target frame image by an optical flow. A distance between the black dot A and the black dot A' in an image is a displacement distance. Specifically, when the displacement distance is calculated, a displacement distance between an optical flow image feature point and an image feature point corresponding to the optical flow image feature point may be calculated according to location coordinates of the optical flow image feature point and the image feature point in respective frame images. Alternatively, the optical flow image feature point A may be projected on a corresponding location in the target frame image, and the displacement distance between the optical flow image feature point A and the corresponding image feature point A' is calculated in the target frame image. Alternatively, the image feature point A' corresponding to the optical flow image feature point A may be projected on a corresponding location in the previous frame image, and the displacement distance between the optical flow image feature point A and the corresponding image feature point A' is calculated in the previous frame image.

104. Output the target frame image in response to determining according to the displacement distance that the target frame image is captured in a non-motion state.

In this embodiment of this application, the outputting the target frame image may be saving the target frame image, sharing the target frame image, or showing the target frame image. A specific outputting form is not limited in the embodiments of this application.

For example, a terminal continuously captures a plurality of images, and may show a user an image with a better imaging effect through the foregoing operations, or save the image with a better imaging effect, and further delete an image with a poor imaging effect. It not only can improve user satisfaction, but also can effectively save a storage space of the terminal.

By implementing this embodiment of this application, the terminal can be prevented from outputting the image with a poor imaging effect, so as to provide an image with a good imaging effect for the user, improve image processing efficiency of the terminal, and increase user satisfaction.

In real life, a QR code scanning function of a QQ browser or augmented reality (AR) cloud recognition generally requires uploading an image to a cloud to request a related image processing service. However, when a mobile device is used to capture an image, motion of the mobile device affects the imaging effect, for example, leads to blurred imaging. In this case, because the image is blurred, the cloud cannot effectively recognize the image. Therefore, in an optional implementation, the outputting the target frame image includes:

submitting the target frame image to a server. Specifically, the server includes a cloud server, a local backend processing server, and the like, which is not limited in this embodiment.

Figure 2A:
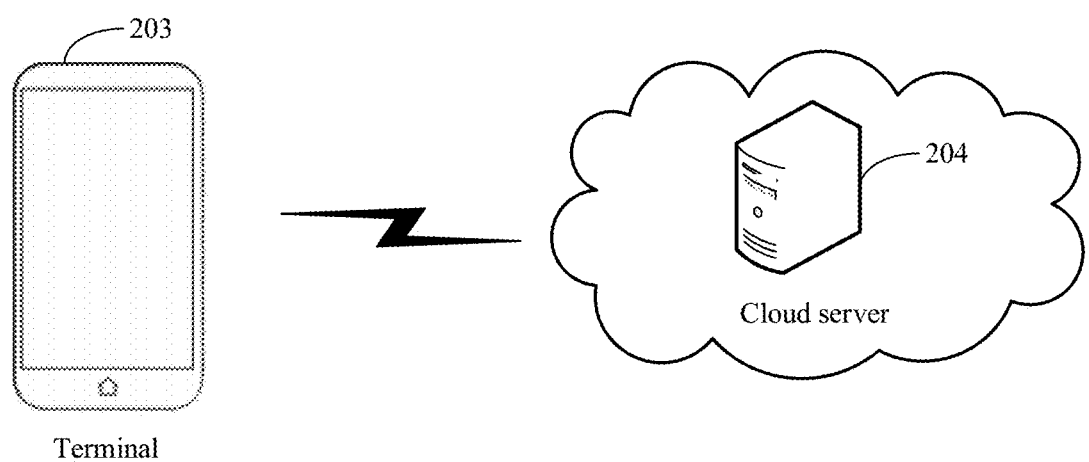
FIG. 2A is a schematic diagram of a network architecture for image processing according to an embodiment of this application.

FIG. 2A is a schematic diagram of a network architecture for image processing according to an embodiment of this application. As shown in FIG. 2A, the network architecture includes: a terminal 203 for image processing and a cloud server 204. The terminal 203 may be a mobile device such as a mobile phone, and may include a camera. The terminal 203 may communicate with the cloud server 204, so as to implement data transmission.

Figure 2B:
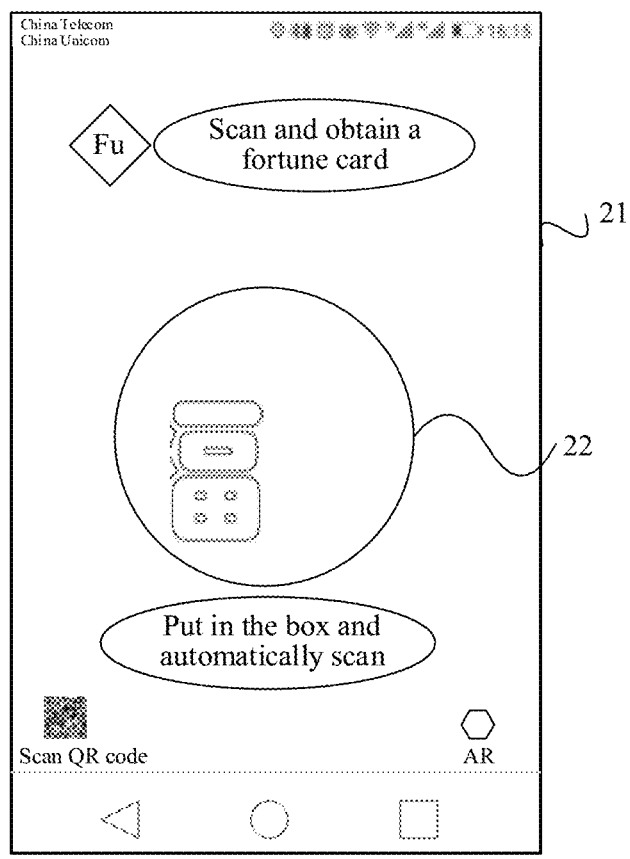
FIG. 2B and FIG. 2C are schematic diagrams of scenarios of image processing according to an embodiment of this application.
Figure 2C:
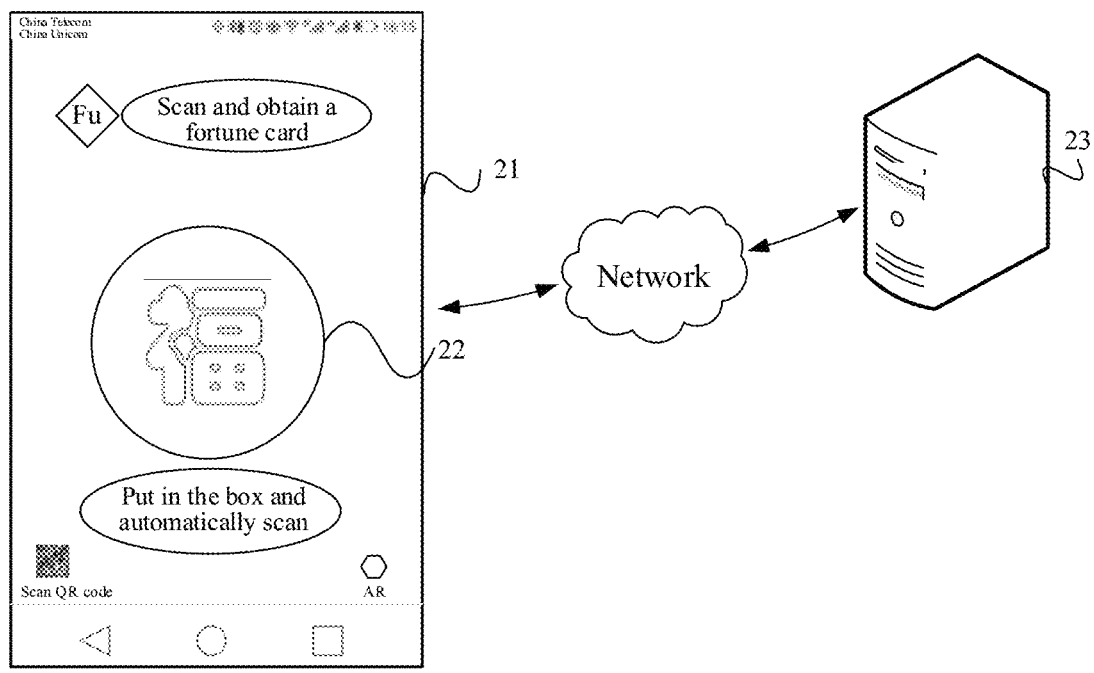

Referring to FIG. 2B and FIG. 2C based on the schematic diagram of the network architecture shown in FIG. 2A, FIG. 2B and FIG. 2C show specific scenarios of image processing according to an embodiment of this application. In this scenario, a user needs to scan a word "Fu" by using a terminal 21, the terminal 21 transmits the scanned word "Fu" to a server 23, and the server 23 performs recognition processing on the received word. As shown in FIG. 2B, the user scans the word "Fu" by using the terminal 21. It can be seen from the figure that a scanning box 22 of the terminal 21 does not obtain a sufficient quantity of feature points. In other words, a target frame image obtained by the scanning box 22 is an invalid frame image. In this case, the terminal 21 may not upload the target frame image to the server 23. As shown in FIG. 2C, the terminal 21 uploads the target frame image to the server 23 in a case that the target frame image obtained by the terminal 21 is a valid frame image and the terminal 21 determines that the target frame image is captured in a non-motion state. After the server 23 recognizes the target frame image, a red packet or a fortune card may be delivered to the terminal 21. It can be understood that, in this scenario, the terminal 21 avoids constantly uploading invalid frame images to the server 23, reduces a quantity of uploading operations, and avoids a problem that the load of the server 23 is increased because the server 23 constantly recognizes target frame images.

By implementing this embodiment, on one hand, the server can effectively recognize the target frame image, thereby improving image recognition efficiency of the server; on the other hand, the terminal can upload a frame image meeting the foregoing conditions to the server, thereby effectively reducing a quantity of frames that are to be loaded, and saving cellular network data.

Figure 3A:
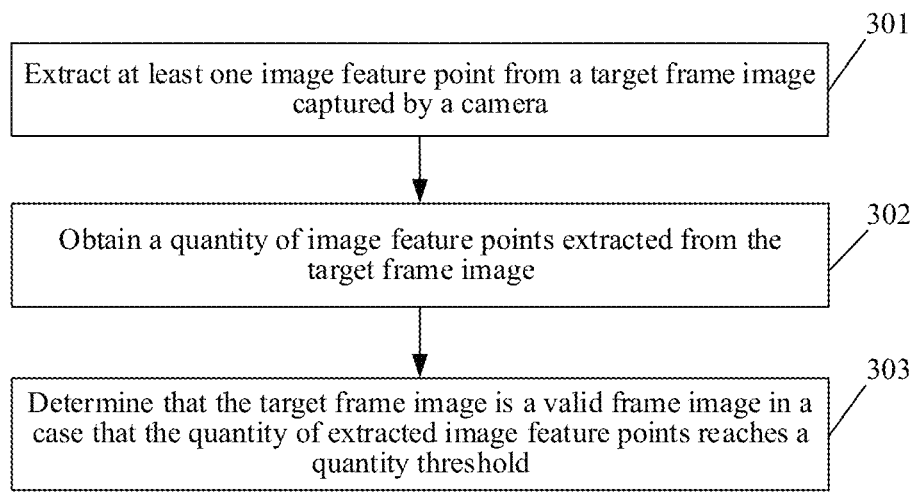
FIG. 3A is a schematic flowchart of a method for determining that a target frame image is a valid frame image according to an embodiment of this application.

FIG. 3A is a schematic flowchart of a method for determining that a target frame image is a valid frame image according to an embodiment of this application. The method may be applied to a terminal for image processing. As shown in FIG. 3A, the method for determining that a target frame image is a valid frame image may include:

301. Extract at least one image feature point from a target frame image captured by a camera.

302. Obtain a quantity of image feature points extracted from the target frame image.

303. Determine that the target frame image is a valid frame image in a case that the quantity of extracted image feature points reaches a quantity threshold.

The quantity threshold is used for determining whether the quantity of image feature points reaches the quantity threshold. If the quantity of image feature points reaches the quantity threshold, it is determined that the target frame image is a valid frame image. Generally, a larger quantity of image feature points indicates a richer degree of frame images, and a small quantity of image feature points indicates a lower distinction degree among the frame images. Therefore, the quantity threshold may be set by the terminal, which is not limited in this embodiment. Specifically, the quantity threshold may be set before the terminal captures the target frame image, or before the terminal captures a previous frame image. The quantity threshold may be set by the terminal according to an actual situation, which is not limited in the embodiments of this application.

For example, the quantity threshold may be 50. In other words, it may be determined that the target frame image is a valid frame image in a case that the quantity of image feature points extracted from the target frame image reaches 50.

Specifically, an embodiment of this application further provides a method for determining an image feature point, which is as follows:

A proportion of differential pixel points, in adjacent pixel points around the image feature point, whose pixel features are different from the feature information of the image feature point, to all the adjacent pixel points reaches a proportion threshold.

Figure 3B:
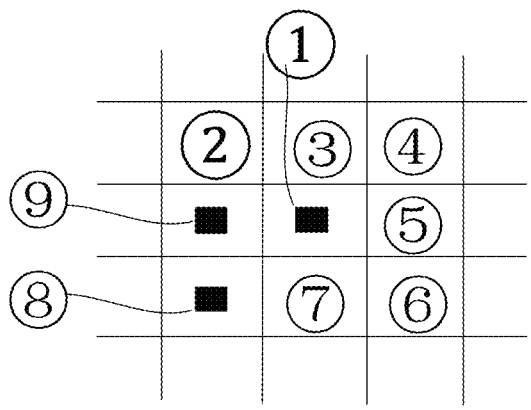
FIG. 3B is a schematic diagram of a scenario of distinguishing image feature points according to an embodiment of this application.

In this embodiment, for example, the proportion threshold is 3/4. As shown in FIG. 3B, FIG. 3B is a schematic diagram of a scenario of distinguishing image feature points according to an embodiment of this application. ① to ⑨ in the figure are all pixel points, and ② to ⑨ are all adjacent pixel points of ①. It can be seen from the figure that ② to ⑦ are pixel points different from ①. In other words, ② to ⑦ are differential pixel points different from an image feature point. Therefore, a proportion of differential pixel points, in adjacent pixel points around the image feature point, whose pixel features are different from the feature information of the image feature point, to all the adjacent pixel points is 3/4. In other words, the proportion reaches the proportion threshold 3/4. Therefore, the pixel point ① is the image feature point. It can be understood that FIG. 3B is merely an example, and the exemplary pixel points and quantities are merely an example. Therefore, the example in FIG. 3B cannot be understood as having a limited meaning.

Figure 3C:
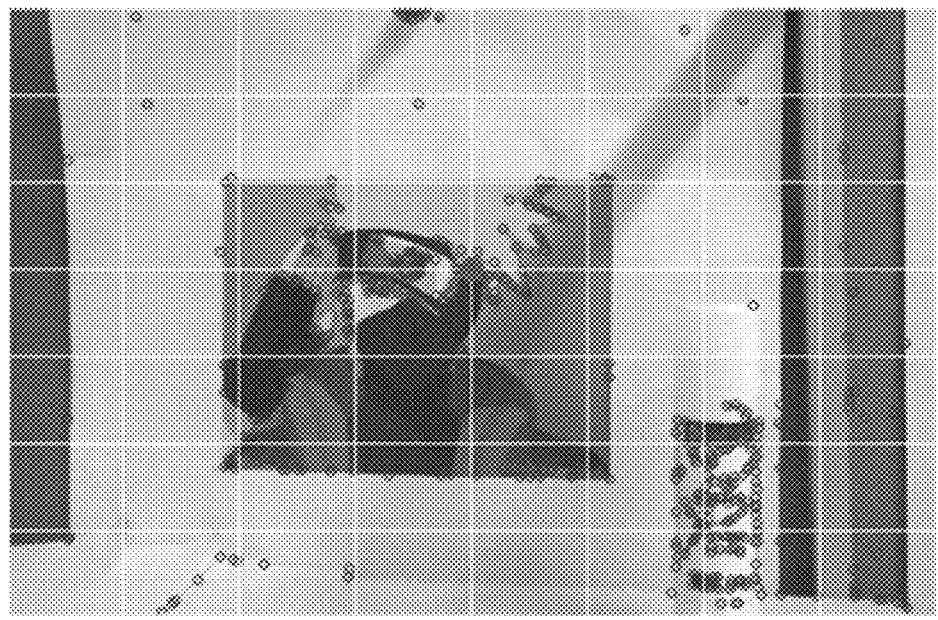
FIG. 3C is a schematic diagram of an interface of image feature points according to an embodiment of this application.

For another example, as shown in FIG. 3C, dot portions in the figure are image feature points. It can be seen that the image feature points are obviously different from surrounding pixel points.

In this embodiment of this application, whether a target frame image is a valid frame image is determined by obtaining a quantity of image feature points, so that a terminal can process the target frame image. By implementing this embodiment, the terminal can be prevented from obtaining a blurred image or an image containing no specific content, thereby improving processing efficiency of the terminal.

In this embodiment, the embodiments of this application further provide a method for transmitting guidance information, which is as follows:

transmitting guidance information in a case that the quantity of extracted image feature points does not reach the quantity threshold, where the guidance information is used for prompting a user to adjust a camera photographing location.

Figure 3D:
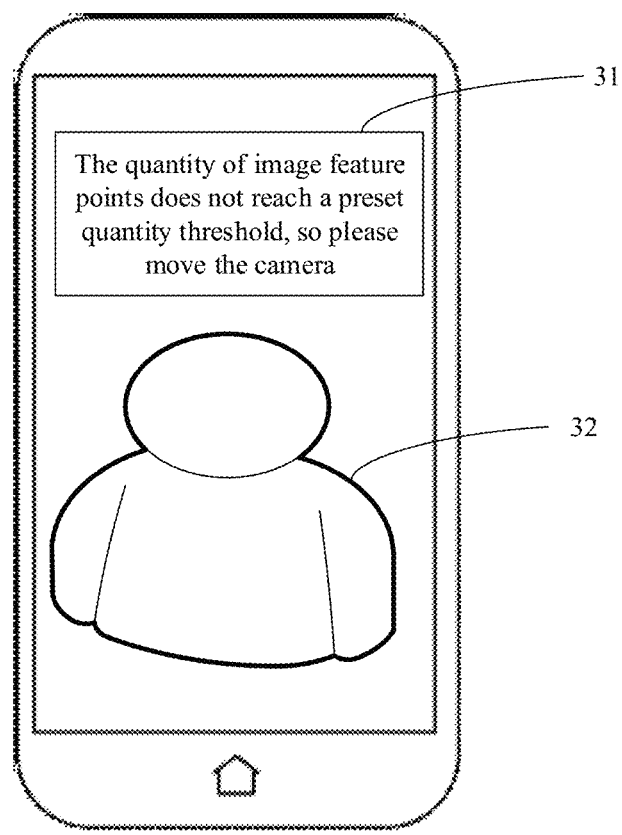
FIG. 3D is a schematic diagram of an interface of one type of guidance information according to an embodiment of this application.

FIG. 3D is a schematic diagram of a scenario of one type of guidance information according to an embodiment of this application. As shown in FIG. 3D, 31 is guidance information transmitted by a terminal, and 32 is a target frame image captured by the terminal. When the quantity of image feature points, in the target frame image, extracted by the terminal does not reach a quantity threshold set by the terminal, the terminal transmits the guidance information 31. It can be understood that FIG. 3D is merely an example, and cannot be understood as having a limited meaning.

By implementing this embodiment, the terminal guides a user to operate by transmitting the guidance information, which can improve efficiency of obtaining the target frame image by the terminal.

Figure 4:
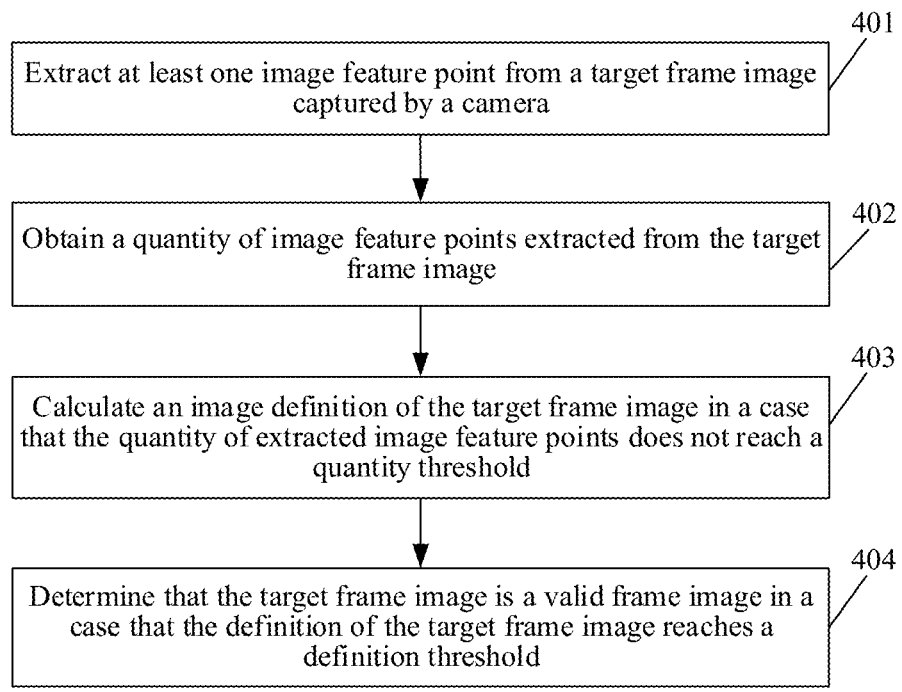
FIG. 4 is a schematic flowchart of another method for determining that a target frame image is a valid frame image according to an embodiment of this application.

FIG. 4 is a schematic flowchart of another method for determining that a target frame image is a valid frame image according to an embodiment of this application. As shown in FIG. 4, the method may include:

401. Extract at least one image feature point from a target frame image captured by a camera.

402. Obtain a quantity of image feature points extracted from the target frame image.

403. Calculate an image definition of the target frame image in a case that the quantity of extracted image feature points does not reach a quantity threshold.

In image processing, ambiguity and definition are two concepts that describe degree of definition (degree of ambiguity) of an image, and that are opposite and related to each other. A clearer image indicates higher quality, a higher definition, and a lower ambiguity. An unclear (fuzzier) image indicates lower quality, a lower definition, and a higher ambiguity. Therefore, both the definition and the ambiguity may be used for describing the degree of definition of an image, except that a value of the definition is inversely proportional to a value of the ambiguity. Therefore, the method for determining that the target frame image is a valid frame image cannot be understood as having a limited meaning. In other words, whether the target frame image is a valid frame image may be determined by calculating the ambiguity of the target frame image.

It can be understood that the quantity threshold in this embodiment of this application may be equal to the quantity threshold in FIG. 3A, which is not limited in the embodiments of this application.

Specifically, the calculating an image definition of the target frame image includes:

calculating an image gradient value of the target frame image, and determining the image definition of the target frame image according to the image gradient value.

Generally, evaluation functions of the image definition include a gray-scale change function, a gradient function, an image gray-scale entropy function, and the like. Specifically, in the image processing, the image gradient function, for example, an image gray-scale energy function, a Robert gradient, and a Laplace operator, may be used for performing edge extraction. Better focusing and a sharper image edge indicate a greater image gradient value. Therefore, the gradient function may be used for calculating the definition of the target frame image.

Specifically, in this embodiment of this application, the calculating an image definition of the target frame image may include: performing Laplace transform on the target frame image, and obtaining a gradient map (that is, a change range of pixels in an initial frame) of the target frame image. A variance of the gradient map is the ambiguity. A lager variance indicates a higher definition and a higher distinction degree. A lower variance indicates a lower distinction degree of frames.

404. Determine that the target frame image is a valid frame image in a case that the definition of the target frame image reaches a definition threshold.

In this embodiment of this application, the definition threshold may be set before a terminal performs the method provided in this embodiment of this application, or may be set after the definition of the target frame image is calculated and before the definition of the target frame image is compared with the definition threshold, which is not limited in the embodiments of this application.

It can be understood that when the definition of the target frame image does not reach the definition threshold, the terminal may further transmit definition prompt information. The definition prompt information is used for prompting a user to pay attention to focusing, which is not specifically limited in the embodiments of this application.

In this embodiment of this application, whether the definition of the target frame image reaches the definition threshold may be further determined when the quantity of obtained image feature points does not reach the quantity threshold, which avoids sampling an image with a high ambiguity. By implementing this embodiment of this application, the terminal can be prevented from obtaining a blurred image, thereby improving processing efficiency of the terminal.

Figure 5A:
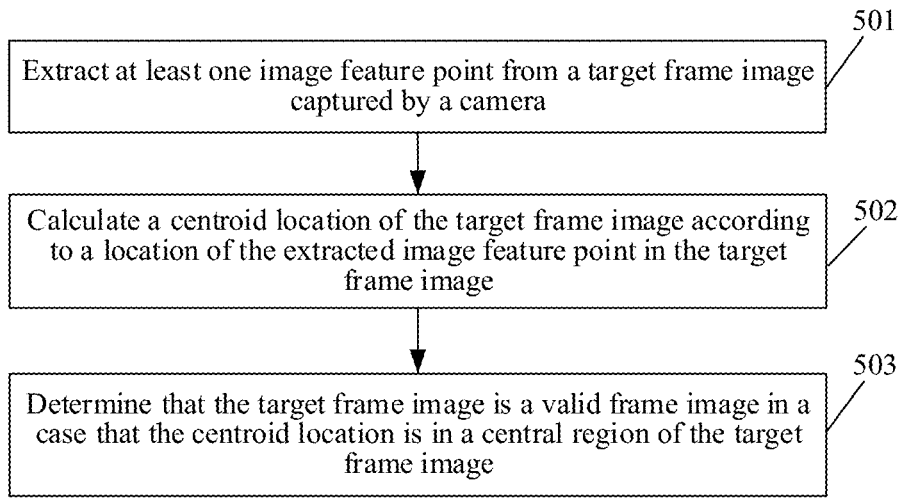
FIG. 5A is a schematic flowchart of still another method for determining that a target frame image is a valid frame image according to an embodiment of this application.

FIG. 5A is a schematic flowchart of still another method for determining that a target frame image is a valid frame image according to an embodiment of this application. As shown in FIG. 5A, the method may include:

501. Extract at least one image feature point from a target frame image captured by a camera.

502. Calculate a centroid location of the target frame image according to a location of the extracted image feature point in the target frame image.

503. Determine that the target frame image is a valid frame image in a case that the centroid location is in a central region of the target frame image.

Figure 5B:
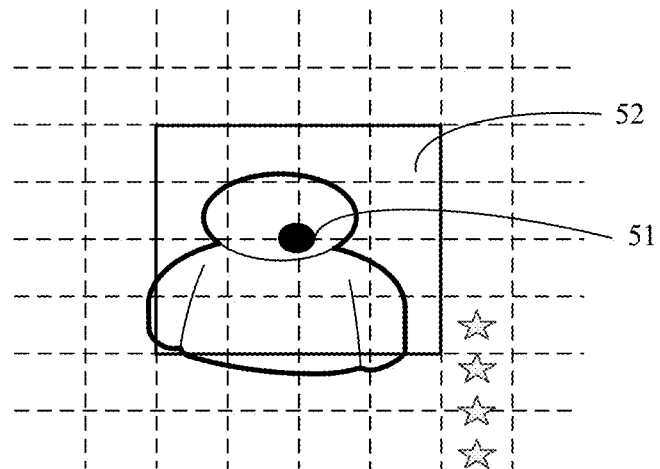
FIG. 5B is a schematic diagram of a scenario of determining a centroid location of a target frame image according to an embodiment of this application.

In this embodiment, FIG. 5B is used as an example to further describe a schematic diagram of a scenario of determining a centroid location of a target frame image according to an embodiment of this application. A black dot 51 in FIG. 5B is the centroid location, and a central region is in a 1/2 area region in the middle of grids, for example, a region 52.

The calculating a centroid location of the target frame image according to a location of the extracted image feature point in the target frame image includes:

determining a plurality of grid sub-regions in the target frame image;

determining a grid sub-region in which each image feature point is located according to the location of the extracted image feature point in the target frame image; and calculating the centroid location of the target frame image according to a quantity of image feature points in each of the plurality of grid sub-regions.

Specifically, in an optional embodiment, steps of determining the centroid location are as follows:

11) Determine a plurality of grid sub-regions in the target frame image, that is, divide the target frame image into N*M grids (N and M may be set according to different heights and widths of the target frame image), and count a quantity of feature points included in each grid, to form an N*M density matrix.

12) Determine a grid sub-region in which each image feature point is located according to the location of the extracted image feature point in the target frame image. In an optional embodiment, some of grid sub-regions may be filtered according to an average quantity of image feature points in grids. For example, a quantity of feature points extracted by using a FAST algorithm is P, and the average quantity of image feature points in the grid sub-regions is Avg=P/N*M. For a grid sub-region in which the quantity of image feature points is less than Avg, the quantity of image feature points included by the grid sub-region is recorded as 0, thereby reducing the impact of a small quantity of local image feature points on a centroid of the entire target frame image.

13) Calculate the centroid location of the target frame image according to a quantity of image feature points in each of the plurality of grid sub-regions, where the centroid location represents a location in which feature points of the target frame image are distributed. A centroid of a density matrix may be calculated by using counts of feature points in a filtered density matrix as a weight according to the method described in the optional embodiment in step 12), and the centroid location may represent a location in which the feature points of the target frame image are distributed.

14) If the central region is in the 1/2 area region in the middle of the grids, in a case that the calculated centroid location is in the 1/2 area region, determine that the target frame image meets a distribution condition, that is, the target frame image is a valid frame image.

The centroid location in FIG. 3C may be determined by using the method for determining a centroid location. For example, a black filled dot shown in FIG. 3C is the centroid location of FIG. 3C.

It can be understood that, the central region may be the 1/2 area region in the middle of the target frame image, or may be a 1/4 area region in the middle of the target frame image, which is not limited in this embodiment.

In this embodiment, guidance information is transmitted in a case that the centroid location is not in the central region of the target frame image, where the guidance information is used for prompting a user to adjust a camera photographing location.

Figure 5C:
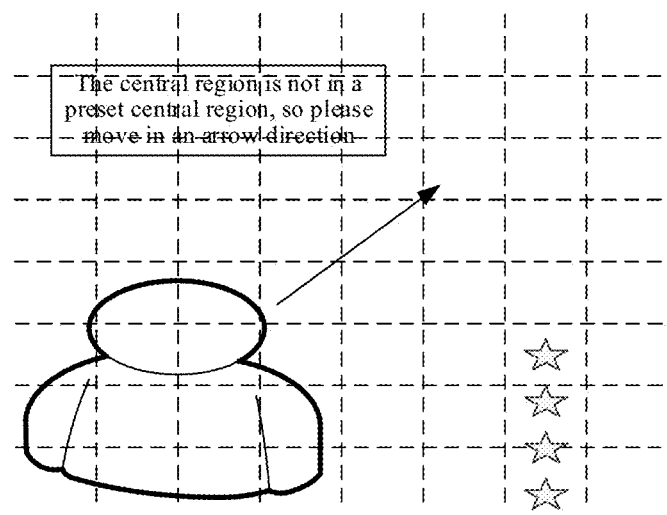
FIG. 5C is a schematic diagram of an interface of another type of guidance information according to an embodiment of this application.

FIG. 5C is a schematic diagram of a scenario of another type of guidance information according to an embodiment of this application. As shown in FIG. 5C, guidance information transmitted by a terminal includes arrow direction information and word prompt information. The terminal transmits the guidance information in a case that a centroid location of a target frame image is not in a central region of the target frame image. It can be understood that FIG. 5C is merely an example, and cannot be understood as having a limited meaning.

By implementing this embodiment of this application, it can be ensured that the centroid location of the target frame image is in the central region, and ensured that the target frame image includes to-be-obtained major content, thereby improving processing efficiency of the terminal.

The methods for determining that a target frame image is a valid frame image that are described in FIG. 3A, FIG. 4, and FIG. 5A may be further applied to determine whether a previous frame image is a valid frame image. In an optional embodiment, when it is determined that the target frame image meets all or some of conditions in FIG. 3A, FIG. 4, and FIG. 5A, it may be confirmed that the target frame image is a valid frame image. Alternatively, when it is determined that the target frame image does not meet all or some of conditions in FIG. 3A, FIG. 4, and FIG. 5A, it is determined that the target frame image is not a valid frame image.

In specific implementation, the methods in FIG. 3A, FIG. 4, and FIG. 5A may be respectively performed to determine whether the target frame image is a valid frame image. Alternatively, the methods in FIG. 3A, FIG. 4, and FIG. 5A may be combined to determine whether the target frame image is a valid frame image. For example, a sequence described in FIG. 8 may be used for determining that the target frame image is a valid frame image. Alternatively, a sequence described in FIG. 9 may be used for determining that the target frame image is a valid frame image. A sequence or a combination sequence of FIG. 3A, FIG. 4, and FIG. 5A is not limited in the embodiments of this application.

Figure 6A:
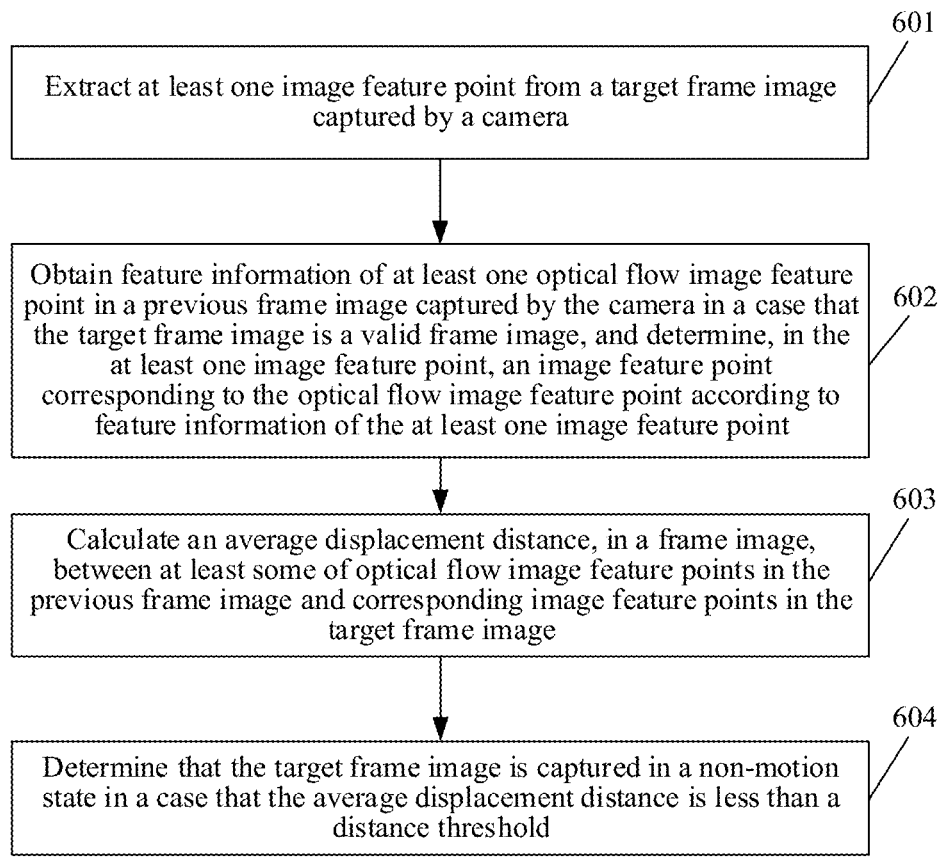
FIG. 6A is a schematic flowchart of a method for determining that a target frame image is captured in a non-motion state according to an embodiment of this application.

FIG. 6A is a schematic flowchart of a method for determining that a target frame image is captured in a non-motion state according to an embodiment of this application. As shown in FIG. 6A, the method may include:

601. Extract at least one image feature point from a target frame image captured by a camera.

602. Obtain feature information of at least one optical flow image feature point in a previous frame image captured by the camera in a case that the target frame image is a valid frame image, and determine, in the at least one image feature point, an image feature point corresponding to the optical flow image feature point according to feature information of the at least one image feature point.

603. Calculate an average displacement distance, in a frame image, between at least some of optical flow image feature points in the previous frame image and corresponding image feature points in the target frame image.

604. Determine that the target frame image is captured in a non-motion state in a case that the average displacement distance is less than a distance threshold.

In this embodiment, it is determined that the target frame image is captured in the non-motion state in a case that the average displacement distance is less than the distance threshold. A specific value of the distance threshold is not limited in this embodiment.

The determining that the target frame image is captured in a non-motion state in a case that the average displacement distance is less than a distance threshold includes:

respectively calculating average displacement distances, in the frame image, between optical flow image feature points in each frame image and corresponding image feature points in a next frame image in continuous multi-frame images that include the target frame image and are captured by the camera, and determining that the target frame image is captured in the non-motion state in a case that all the average displacement distances between every two adjacent frame images in the continuous multi-frame images are less than the distance threshold.

That is, in the continuous multi-frame images, it is determined that the target frame image is captured in the non-motion state in a case that all average displacement distances between image feature points in each frame image and image feature points in a previous frame image are less than the distance threshold.

By implementing this embodiment of this application, because it is determined that the target frame image is captured in the non-motion state, a terminal can be prevented from capturing a blurred image, thereby improving image processing efficiency of the terminal. The number of times for which the terminal uploads an image to a server is reduced, cellular data required for the terminal to process the image is reduced, and user satisfaction is improved.

Figure 6B:
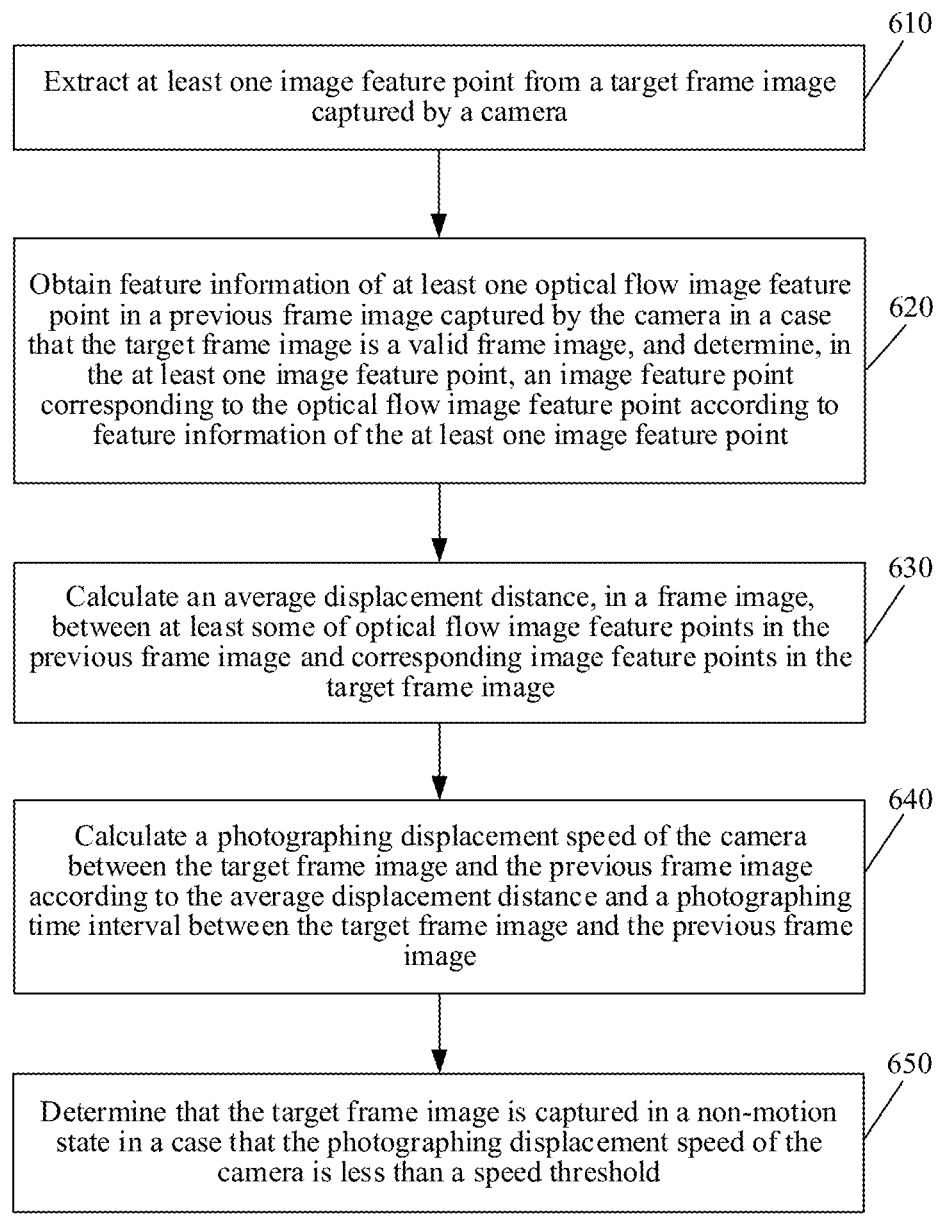
FIG. 6B is a schematic flowchart of another method for determining that a target frame image is captured in a non-motion state according to an embodiment of this application.

FIG. 6B is a schematic flowchart of another method for determining that a target frame image is captured in a non-motion state according to an embodiment of this application. As shown in FIG. 6B, the method may include:

610. Extract at least one image feature point from a target frame image captured by a camera.

620. Obtain feature information of at least one optical flow image feature point in a previous frame image captured by the camera in a case that the target frame image is a valid frame image, and determine, in the at least one image feature point, an image feature point corresponding to the optical flow image feature point according to feature information of the at least one image feature point.

630. Calculate an average displacement distance, in a frame image, between at least some of optical flow image feature points in the previous frame image and corresponding image feature points in the target frame image.

640. Calculate a photographing displacement speed of the camera between the target frame image and the previous frame image according to the average displacement distance and a photographing time interval between the target frame image and the previous frame image.

650. Determine that the target frame image is captured in a non-motion state in a case that the photographing displacement speed of the camera is less than a speed threshold.

In this embodiment of this application, it is determined that the target frame image is captured in the non-motion state in a case that the photographing displacement speed of the camera is less than the speed threshold. A specific value of the speed threshold is not limited in this embodiment.

It can be understood that, in this embodiment, a direction may not be specified for the photographing displacement speed. In other words, the photographing displacement speed may be a photographing displacement speed rate, which is not limited in this embodiment.

The determining that the target frame image is captured in a non-motion state in a case that the photographing displacement speed of the camera is less than a speed threshold includes:

respectively calculating average displacement distances, in the frame image, between optical flow image feature points in each frame image and corresponding image feature points in a next frame image, in continuous multi-frame images that includes the target frame image and that are captured by the camera;

calculating photographing displacement speeds of the camera between every two adjacent frame images according to average displacement distances and photographing time intervals between every two adjacent frame images in the continuous multi-frame images; and determining that the target frame image is captured in the non-motion state in a case that all the photographing displacement speeds of the camera between every two adjacent frame images are less than the speed threshold.

That is, in the continuous multi-frame images, it is determined that the target frame image is captured in the non-motion state in a case that all photographing displacement speeds of the camera between each frame image and a previous frame image are less than the speed threshold.

By implementing this embodiment of this application, because it is determined that the target frame image is captured in the non-motion state, a terminal can be prevented from capturing a blurred image, thereby improving image processing efficiency of the terminal. The number of times for which the terminal uploads an image to a server is reduced, cellular data required for the terminal to process the image is reduced, and user satisfaction is improved.

The two methods for determining that a target frame image is captured in the non-motion state that are described in FIG. 6A and FIG. 6B are merely examples. In other optional embodiments, that the target frame image is captured in the non-motion state may be determined according to the displacement distance by using more implementations. For example, when no displacement distance between an image feature point in the target frame image and a corresponding image feature point in the previous frame image is greater than another distance threshold, it may be determined that the target frame image is captured in the non-motion state.

Figure 7:
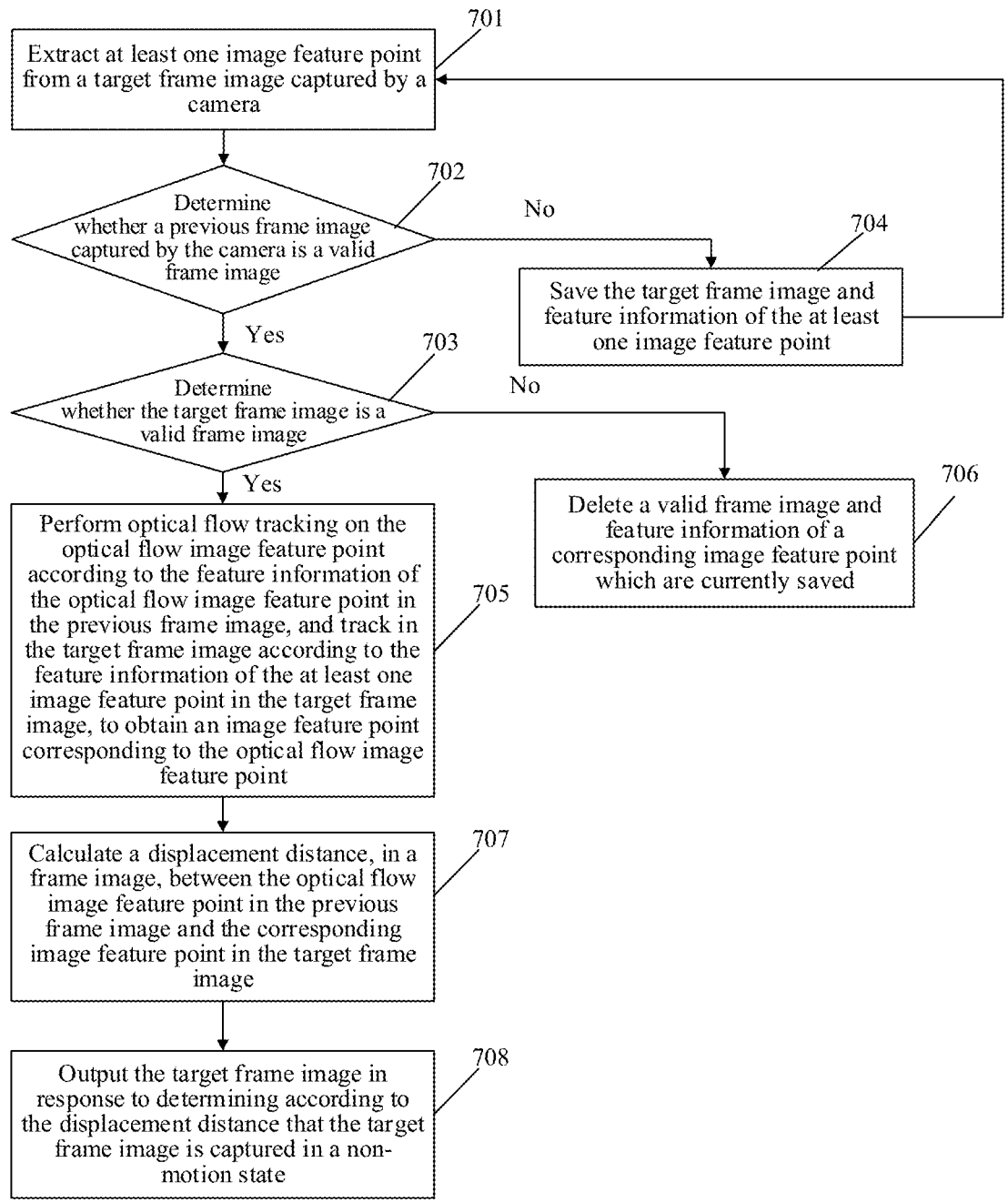
FIG. 7 is a schematic flowchart of another image processing method according to an embodiment of this application.

FIG. 7 is a schematic flowchart of another image processing method according to an embodiment of this application. As shown in FIG. 7, the image processing method may include:

701. Extract at least one image feature point from a target frame image captured by a camera.

702. Determine whether a previous frame image captured by the camera is a valid frame image, and if the previous frame image is a valid frame image, perform 703; otherwise, perform 704.

703. Determine whether the target frame image is a valid frame image, and if the target frame image is a valid frame image, perform 705; otherwise, perform 706.

It can be understood that, for the method for determining whether a previous frame image and a target frame image are valid frame images, reference may be made to the methods described in FIG. 3A, FIG. 4, and FIG. 5A. Details are not described herein.

704. Save the target frame image and feature information of the at least one image feature point.

Specifically, the image feature point is saved as an optical flow feature point used for performing optical flow tracking.

In other words, in a case that the previous frame image is an invalid frame image, a terminal may save the target frame image. That is, the target frame image is used as an initialized frame image, and then the at least one image feature point is extracted from the target frame image captured by the camera.

705. Perform optical flow tracking on the optical flow image feature point according to the feature information of the optical flow image feature point in the previous frame image, and track in the target frame image according to the feature information of the at least one image feature point in the target frame image, to obtain an image feature point corresponding to the optical flow image feature point.

706. Delete a valid frame image and feature information of a corresponding image feature point which are currently saved.

In other words, in a case that the target frame image is an invalid frame image, the terminal may directly delete the saved valid frame image, to re-initialize a frame image.

707. Calculate a displacement distance, in a frame image, between the optical flow image feature point in the previous frame image and the corresponding image feature point in the target frame image.

708. Output the target frame image in response to determining according to the displacement distance that the target frame image is captured in a non-motion state.

It can be understood that, for the method for determining according to the displacement distance that the target frame image is captured in a non-motion state, reference may be made to the methods described in FIG. 6A and FIG. 6B. Details are not described herein.

By implementing this embodiment of this application, a displacement distance, in an image, between an image feature point in the target frame image and a corresponding image feature point in the previous frame image is calculated in a case that the previous frame image and the target frame image are valid frame images. In other words, in a case that an initialized frame image is a valid frame image, subsequent operations are performed, which can effectively improve efficiency of the optical flow tracking, and improve calculation accuracy of the displacement distance. Therefore, efficiency of outputting the target frame image by a terminal is improved, and user satisfaction is increased.

Figure 8:
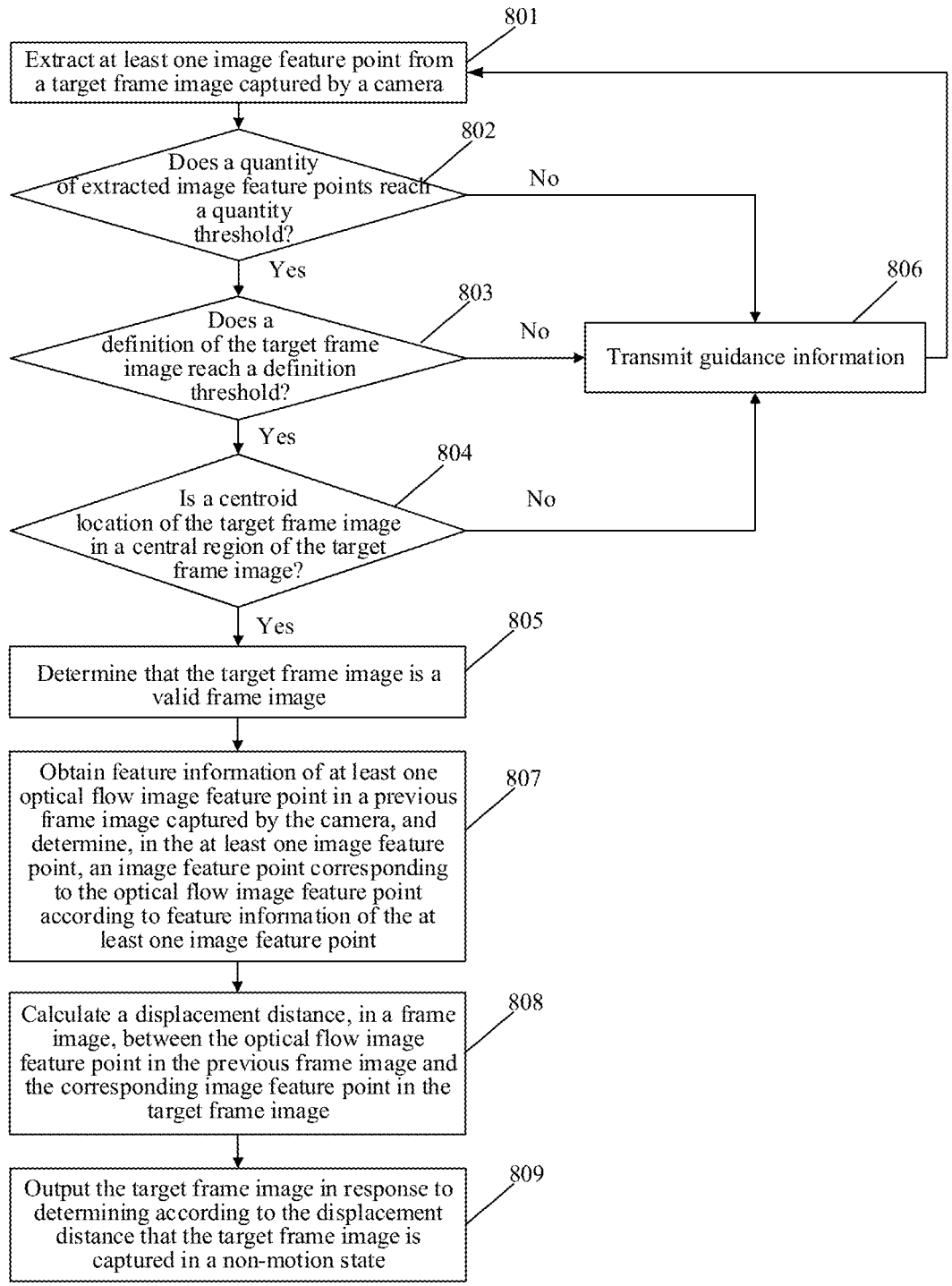
FIG. 8 is a schematic flowchart of still another image processing method according to an embodiment of this application.

FIG. 8 is a schematic flowchart of still another image processing method according to an embodiment of this application. The image processing method may be applied to a terminal for image processing, such as a mobile device or a tablet computer, which is not limited in the embodiments of this application. As shown in FIG. 8, the image processing method may include:

801. Extract at least one image feature point from a target frame image captured by a camera.

802. Determine whether a quantity of extracted image feature points reaches a quantity threshold, and if the quantity of image feature points reaches the quantity threshold, perform 803; otherwise, perform 806.

803. Determine whether a definition of the target frame image reaches a definition threshold, and if the definition of the target frame image reaches the definition threshold, perform 804; otherwise, perform 806.

804. Determine whether a centroid location of the target frame image is in a central region of the target frame image, and if the centroid location of the target frame image is in the central region of the target frame image, perform 805; otherwise, perform 806.

805. Determine that the target frame image is a valid frame image.

It can be understood that a sequence of step 802, step 803, and step 804 is not limited in the embodiments of this application.

806. Transmit guidance information.

The guidance information is used for prompting a user to adjust a camera photographing location.

807. Obtain feature information of at least one optical flow image feature point in a previous frame image captured by the camera, and determine, in the at least one image feature point, an image feature point corresponding to the optical flow image feature point according to feature information of the at least one image feature point.

808. Calculate a displacement distance, in a frame image, between the optical flow image feature point in the previous frame image and the corresponding image feature point in the target frame image.

809. Output the target frame image in response to determining according to the displacement distance that the target frame image is captured in a non-motion state.

For a specific implementation in this embodiment of this application, reference may be made to the implementations of the foregoing embodiments. Details are not described herein.

By implementing this embodiment of this application, interaction between a terminal and a user can be implemented. Therefore, in a case that the target frame image obtained by the terminal does not meet a requirement, the user is guided to perform related operations, thereby providing the user with more intuitive guidance operations, and improving user satisfaction. In addition, efficiency of outputting an image by the terminal is improved, and outputting of an image with blurred imaging is avoided.

Figure 9:
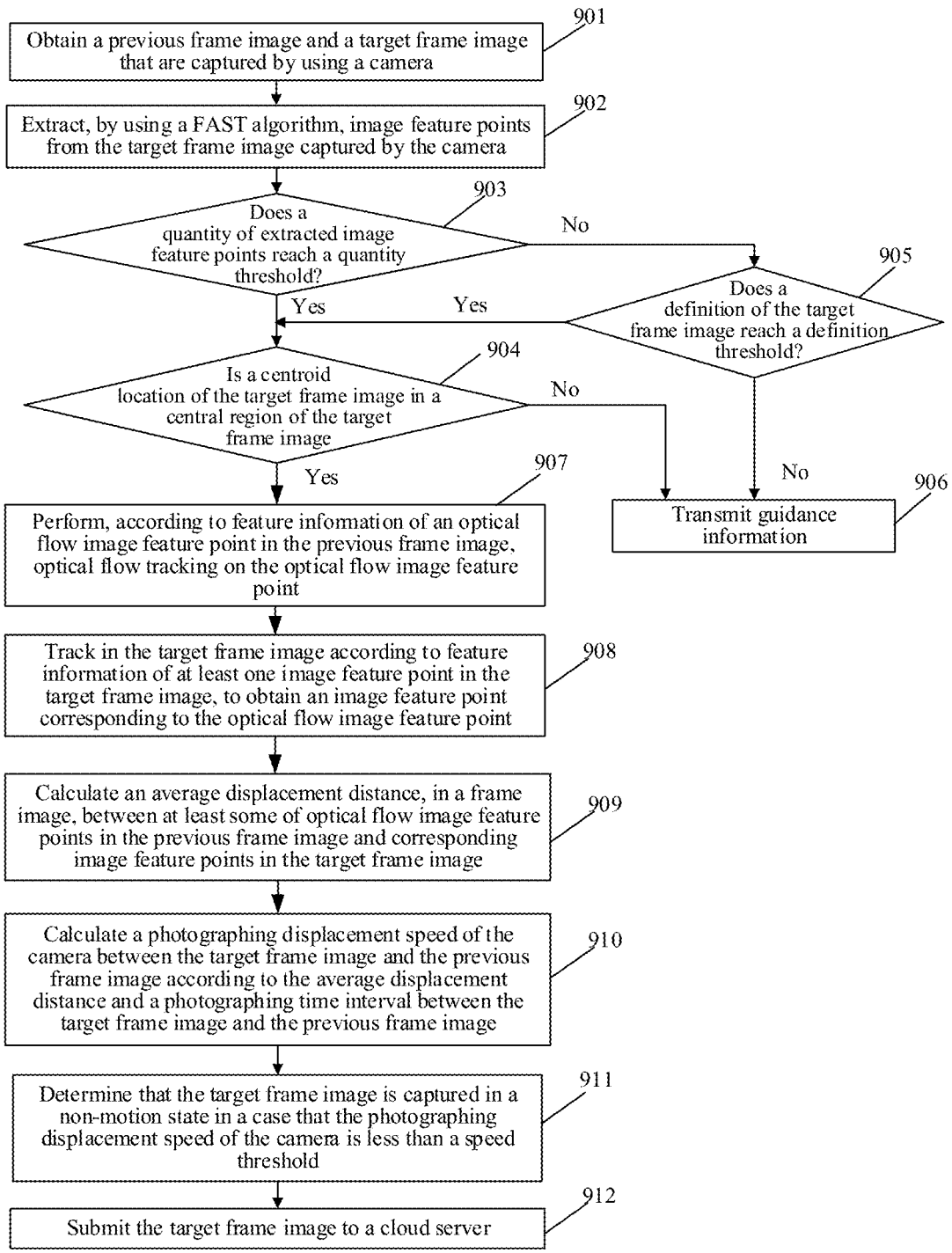
FIG. 9 is a schematic diagram of a specific scenario of image processing according to an embodiment of this application.

To describe the method described in the foregoing embodiments more clearly, FIG. 9 is a schematic diagram of a specific scenario of an image processing method according to an embodiment of this application. The image processing method may be applied to a mobile device. The method described in FIG. 9 may be based on the schematic diagram of the network architecture provided in FIG. 2A. As shown in FIG. 9, the image processing method may include:

901. Obtain a previous frame image and a target frame image that are captured by using a camera, where the previous frame image is a previous frame image relative to the target frame image.

902. Extract, by using a FAST algorithm, image feature points from the target frame image captured by the camera.

903. Detect whether a quantity of extracted image feature points reaches a quantity threshold, and if the quantity of image feature points reaches the quantity threshold, perform 904; otherwise, perform 905.

904. Detect whether a centroid location of the target frame image is in a central region of the target frame image according to the extracted image feature points, and if the centroid location of the target frame image is in the central region of the target frame image, perform 907; otherwise, perform 906.

905. Detect whether a definition of the target frame image reaches a definition threshold, and if the definition of the target frame image reaches the definition threshold, perform 904; otherwise, perform 906.

The image may be blurred, or the camera does not capture specific content, so that the quantity of extracted image feature points does not reach the quantity threshold. Therefore, in a case that the quantity of extracted image feature points does not reach the quantity threshold, the definition of the target frame image is further determined, which can effectively ensure the imaging effect of the target frame image, and improve image processing efficiency of the terminal, thereby further improving image recognition efficiency of the server.

906. Transmit guidance information.

The guidance information is used for prompting a user to adjust a camera photographing location.

907. Perform, according to feature information of an optical flow image feature point in the previous frame image, optical flow tracking on the optical flow image feature point in a case that the previous frame image captured by the camera is a valid frame image.

908. Track in the target frame image according to feature information of at least one image feature point in the target frame image, to obtain an image feature point corresponding to the optical flow image feature point.

909. Calculate an average displacement distance, in a frame image, between at least some of optical flow image feature points in the previous frame image and corresponding image feature points in the target frame image.

910. Calculate a photographing displacement speed of the camera between the target frame image and the previous frame image according to the average displacement distance and a photographing time interval between the target frame image and the previous frame image.

911. Determine that the target frame image is captured in a non-motion state in a case that the photographing displacement speed of the camera is less than a speed threshold.

912. Submit the target frame image to a cloud server.

Based on the method described in FIG. 9, an example in life is used. If a user uses a QR code scanning function of a mobile phone, in a process of renting a shared bike, if an image scanned by the mobile phone is blurred, a server may fail in recognizing the image. In this case, the mobile phone needs to continually perform sampling and uploading operations.

Therefore, by implementing this embodiment of this application, in a case that an image scanned by a terminal such as a mobile device is blurred, a user may be guided to re-scan, so that when the image scanned by the mobile device has a good imaging effect, the image is uploaded to a server. On one hand, the number of times for which the mobile device requests to upload an image can be reduced, traffic consumption is reduced, and quality of the image uploaded by the mobile phone is ensured. On the other hand, the request for resources of the server is reduced, and recognition efficiency of the server is improved.

In the foregoing embodiments, description of each embodiment focuses on a different part, and for parts that are not described in detail in one embodiment, reference may be made to the related description of other embodiments.

It can be understood that, although the steps of the flowcharts in FIG. 1A, FIG. 3A, FIG. 4, FIG. 5A, FIG. 6A, FIG. 6B, and FIG. 7 to FIG. 9 are displayed sequentially according to arrows, the steps are not necessarily performed according to an order indicated by the arrows. Unless explicitly specified in this application, performing of the steps is not strictly limited, and the steps may be performed in other sequences. In addition, at least some steps in FIG. 1A, FIG. 3A, FIG. 4, FIG. 5A, FIG. 6A, FIG. 6B, and FIG. 7 to FIG. 9 may include a plurality of substeps or a plurality of stages. The substeps or the stages are not necessarily performed at a same moment, and instead may be performed at different moments. A performing sequence of the substeps or the stages is not necessarily performing in sequence, and instead may be performing in turn or alternately with another step or at least some of substeps or stages of the another step.

Figure 10:
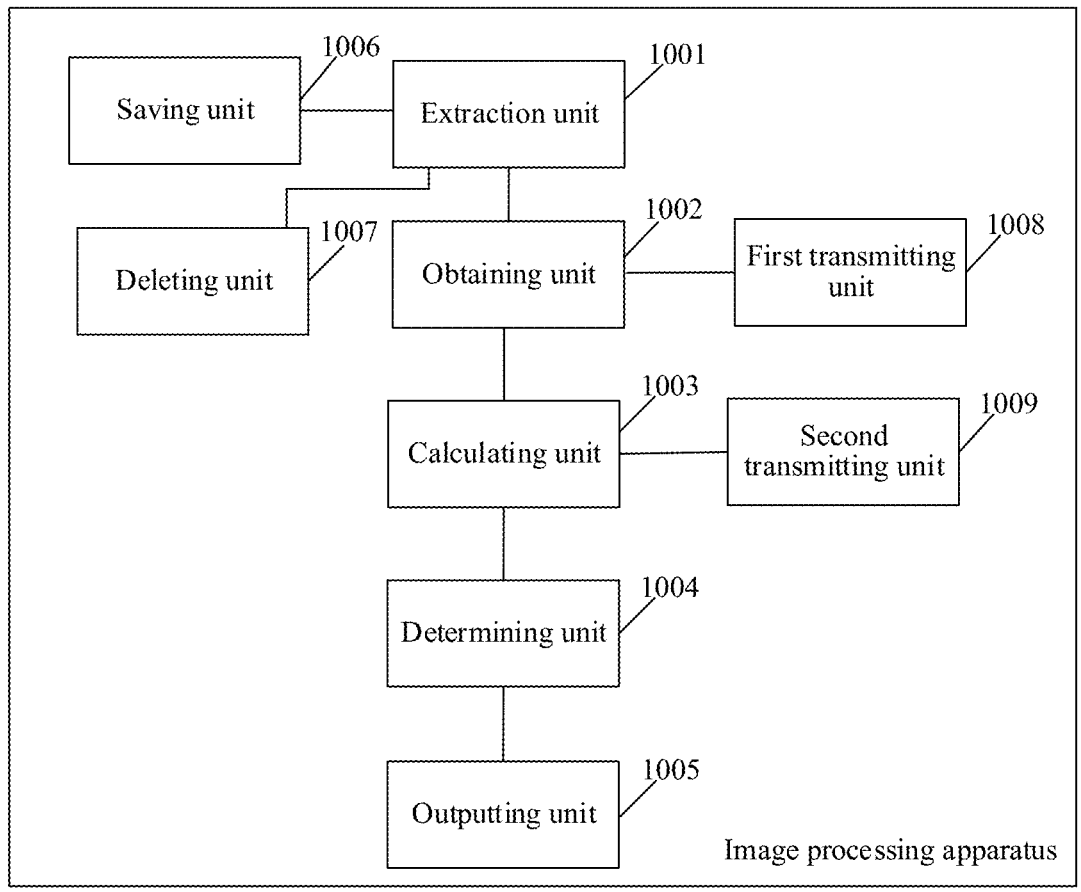
FIG. 10 is a schematic structural diagram of an image processing apparatus according to an embodiment of this application.

FIG. 10 is a schematic structural diagram of an image processing apparatus according to an embodiment of this application. The image processing apparatus may be configured to perform the image processing methods provided in the embodiments of this application, which is not limited in the embodiments of this application. As shown in FIG. 10, the image processing apparatus may include:

an extraction unit 1001, configured to extract at least one image feature point from a target frame image captured by a camera;

an obtaining unit 1002, configured to obtain feature information of at least one optical flow image feature point in a previous frame image captured by the camera in a case that the target frame image is a valid frame image, and determine, in the at least one image feature point, an image feature point corresponding to the optical flow image feature point according to feature information of the at least one image feature point;

a calculating unit 1003, configured to calculate a displacement distance, in a frame image, between the optical flow image feature point in the previous frame image and the corresponding image feature point in the target frame image;

a determining unit 1004, configured to determine according to the displacement distance that the target frame image is captured in a non-motion state; and an outputting unit 1005, configured to output the target frame image in a case that the determining unit 1004 determines according to the displacement distance that the target frame image is captured in the non-motion state.

By implementing this embodiment of this application, the image processing apparatus can be prevented from outputting an image with a poor imaging effect, so as to provide an image with a good imaging effect for the user, improve image processing efficiency of the image processing apparatus, and increase user satisfaction.

In an optional implementation, the obtaining unit 1002 is specifically configured to perform optical flow tracking on the optical flow image feature point according to the feature information of the optical flow image feature point in the previous frame image, and track in the target frame image according to the feature information of the at least one image feature point in the target frame image, to obtain the image feature point corresponding to the optical flow image feature point.

In this embodiment, the obtaining unit 1002 is specifically configured to perform the optical flow tracking on the optical flow image feature point according to the feature information of the optical flow image feature point in the previous frame image in a case that the previous frame image captured by the camera is a valid frame image.

The image processing apparatus may further include:

a saving unit 1006, configured to save the target frame image and the feature information of the at least one image feature point in a case that the previous frame image is not a valid frame image, where the image feature point is saved as an optical flow image feature point used for performing the optical flow tracking.

In an optional implementation, the image processing apparatus may further include:

a deleting unit 1007, configured to delete a valid frame image and feature information of an optical flow image feature point in the valid frame image which are currently saved, in a case that the target frame image is not a valid frame image.

The feature information includes pixel color information or luminance information of the image feature point.

By implementing this embodiment of this application, a displacement distance, in an image, between an image feature point in the target frame image and a corresponding image feature point in the previous frame image is calculated in a case that the previous frame image and the target frame image are valid frame images. In other words, in a case that an initialized frame image is a valid frame image, subsequent operations are performed, which can effectively improve efficiency of the optical flow tracking, and improve calculation accuracy of the displacement distance. Therefore, efficiency of outputting the target frame image by the image processing apparatus is improved, and user satisfaction is increased.

Figure 11A:
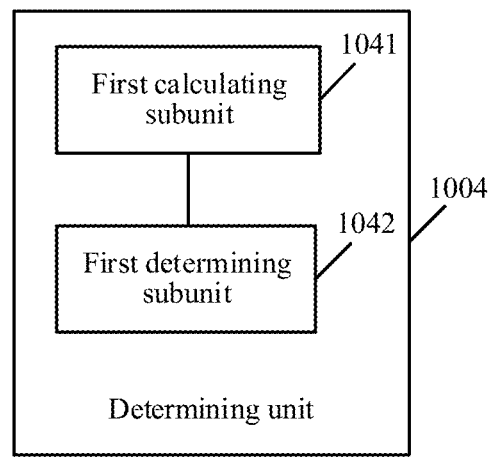
FIG. 11A is a schematic structural diagram of a determining unit according to an embodiment of this application.

Specifically, based on the image processing apparatus shown in FIG. 10, as shown in FIG. 11A, the determining unit 1004 specifically includes:

a first calculating subunit 1041, configured to calculate an average displacement distance, in a frame image, between at least some of optical flow image feature points in the previous frame image and corresponding image feature points in the target frame image; and a first determining subunit 1042, configured to determine that the target frame image is captured in a non-motion state in a case that the average displacement distance is less than a distance threshold.

The first determining subunit 1042 is specifically configured to respectively calculate average displacement distances, in a frame image, between optical flow image feature points in each frame image and corresponding image feature points in a next frame image, in continuous multi-frame images that include the target frame image and that are captured by the camera, and determine that the target frame image is captured in the non-motion state in a case that all the average displacement distances between every two adjacent frame images in the continuous multi-frame images are less than the distance threshold.

By implementing this embodiment of this application, whether the target frame image is captured in the non-motion state may be effectively determined, so that imaging efficiency of the image processing apparatus is improved, and occurrence of blurred imaging is avoided.

Figure 11B:
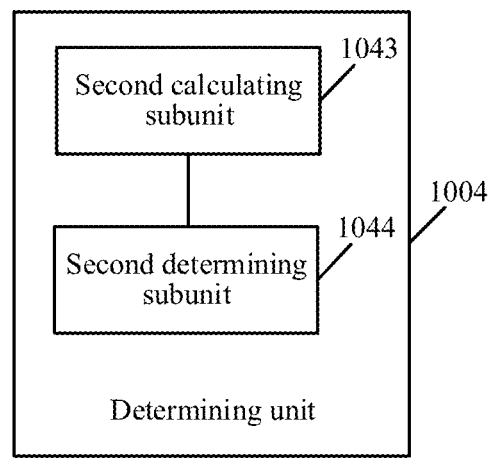
FIG. 11B is a schematic structural diagram of another determining unit according to an embodiment of this application.

In an optional implementation, as shown in FIG. 11B, the determining unit 1004 specifically includes:

a second calculating subunit 1043, configured to calculate an average displacement distance, in a frame image, between at least some of optical flow image feature points in the previous frame image and corresponding image feature points in the target frame image, where the second calculating subunit 1043 is further configured to calculate a photographing displacement speed of the camera between the target frame image and the previous frame image according to the average displacement distance and a photographing time interval between the target frame image and the previous frame image; and a second determining subunit 1044, configured to determine that the target frame image is captured in the non-motion state in a case that the photographing displacement speed of the camera is less than a speed threshold.

The second determining subunit 1044 is specifically configured to respectively calculate average displacement distances, in a frame image, between optical flow image feature points in each frame image and corresponding image feature points in a next frame image, in continuous multi-frame images that include the target frame image and that are captured by the camera; calculate photographing displacement speeds of the camera between every two adjacent frame images according to average displacement distances and photographing time intervals between every two adjacent frame images in the continuous multi-frame images; and determine that the target frame image is captured in the non-motion state in a case that all the photographing displacement speeds of the camera between every two adjacent frame images are less than the speed threshold.

By implementing this embodiment of this application, whether the target frame image is captured in the non-motion state may be effectively determined, so that imaging efficiency of the image processing apparatus is improved, and occurrence of blurred imaging is avoided.

In an optional implementation, the obtaining unit 1002 is further configured to obtain a quantity of image feature points extracted from the target frame image.

The determining unit 1004 is further configured to determine that the target frame image is a valid frame image in a case that the quantity of extracted image feature points reaches a quantity threshold.

A proportion of differential pixel points, in adjacent pixel points around the image feature point, whose pixel features are different from the feature information of the image feature point, to all the adjacent pixel points reaches a proportion threshold.

By implementing this embodiment of this application, whether the target frame image is a valid frame image is determined by using the quantity of image feature points, so that in a case that the target frame image is a valid frame image, subsequent operations are performed. Therefore, image processing efficiency of the image processing apparatus is improved, and imaging efficiency of an image is improved.

In an optional implementation, the image processing apparatus further includes:

a first transmitting unit 1008, configured to transmit guidance information in a case that a quantity of image feature points obtained through extraction does not reach a quantity threshold, where the guidance information is used for prompting a user to adjust a camera photographing location.

By implementing this embodiment of this application, interaction between a terminal and a user can be implemented. Therefore, in a case that the target frame image obtained by the terminal does not meet a requirement, the user is guided to perform related operations, thereby providing the user with more intuitive guidance operations, and improving user satisfaction.

In an optional implementation, the calculating unit 1003 is further configured to calculate an image definition of the target frame image.

The determining unit 1004 is further configured to determine that the target frame image is a valid frame image in a case that the definition of the target frame image reaches a definition threshold.

The obtaining unit 1002 is further configured to obtain a quantity of image feature points extracted from the target frame image.

The determining unit 1004 is specifically configured to calculate, by using the calculating unit, the image definition of the target frame image in a case that the quantity of extracted image feature points does not reach a quantity threshold, and determine that the target frame image is a valid frame image in a case that the definition of the target frame image reaches a definition threshold.

Specifically, the calculating unit 1003 is configured to calculate an image gradient value of the target frame image, and determine the image definition of the target frame image according to the image gradient value.

By implementing this embodiment of this application, whether the target frame image is a valid frame image is determined by using the definition of the target frame image, so that in a case that the target frame image is a valid frame image, subsequent operations are performed. Therefore, image processing efficiency of the image processing apparatus is improved, and imaging efficiency of an image is improved.

In an optional implementation, the determining unit 1004 is further configured to calculate, by using the calculating unit, a centroid location of the target frame image according to a location of the extracted image feature point in the target frame image, and determine that the target frame image is a valid frame image in a case that the centroid location is in a central region of the target frame image. That the determining unit 1004 calculates a centroid location specifically includes: determining a plurality of grid sub-regions of the target frame image; determining a grid sub-region in which each image feature point is located according to the location of the extracted image feature point in the target frame image; and calculating the centroid location of the target frame image according to a quantity of image feature points in each of the plurality of grid sub-regions.

By implementing this embodiment of this application, whether the target frame image is a valid frame image is determined through distribution of the centroid location, so that in a case that the target frame image is a valid frame image, subsequent operations are performed. Therefore, image processing efficiency of the image processing apparatus is improved, and imaging efficiency of an image is improved.

In an optional implementation, the image processing apparatus further includes:

a second transmitting unit 1009, configured to transmit guidance information in a case that the centroid location is not in the central region of the target frame image, where the guidance information is used for prompting a user to adjust a camera photographing location.

By implementing this embodiment of this application, interaction between a terminal and a user can be implemented. Therefore, in a case that the target frame image obtained by the terminal does not meet a requirement, the user is guided to perform related operations, thereby providing the user with more intuitive guidance operations, and improving user satisfaction.

In an optional implementation, the outputting unit 1005 is specifically configured to submit the target frame image to a server.

By implementing this embodiment of this application, on one hand, the server can effectively recognize the target frame image, thereby improving image recognition efficiency of the terminal; on the other hand, the image processing apparatus can upload a frame image meeting the foregoing conditions to the server, thereby effectively reducing a quantity of frames that are to be loaded, and saving cellular network data.

In specific implementation, for specific implementations of the units in the image processing apparatus described in this embodiment of this application, reference may be made to the specific implementations of the foregoing embodiments. Details are not described herein.

Figure 12:
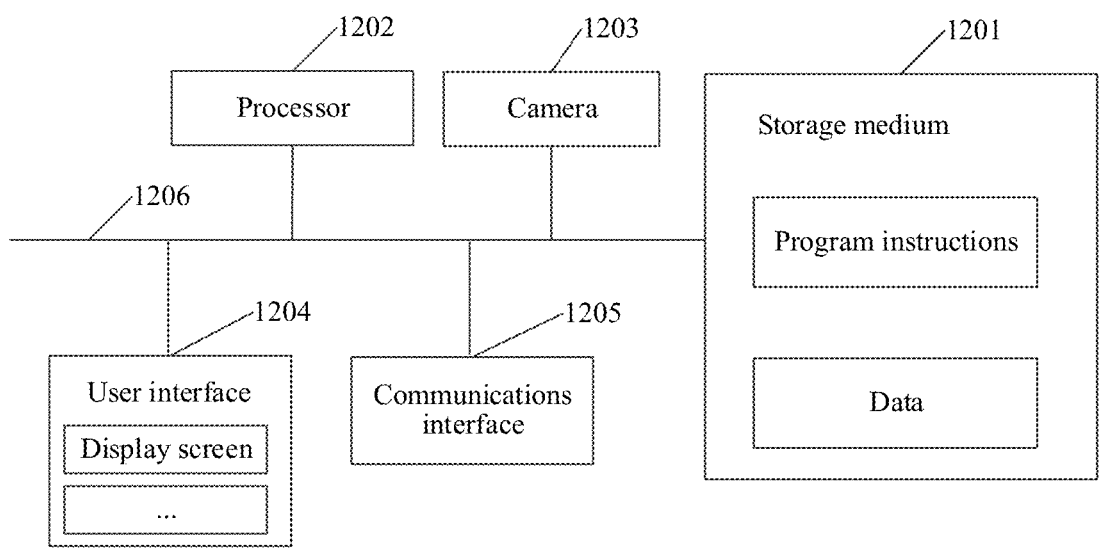
FIG. 12 is a schematic structural diagram of a terminal according to an embodiment of this application.

The image processing apparatus may be implemented as a form of computer programs, and the computer programs may run on a terminal shown in FIG. 12. A storage medium of the terminal may store program units that form the image processing apparatus, such as the extraction unit 1001, the obtaining unit 1002, the calculating unit 1003, the determining unit 1004, and the outputting unit 1005 shown in FIG. 10. The computer programs formed by the program units, when executed by a processor, causes the processor to perform the operations in the image processing method in the embodiments of this application.

FIG. 12 is a schematic structural diagram of a terminal according to an embodiment of this application. As shown in FIG. 12, the terminal includes:

a storage medium 1201, configured to save a frame image captured by a camera, and store program instructions;

a processor 1202, configured to execute the program instructions, the program instructions, when executed by the processor, causing the processor to perform the following operations:

extracting at least one image feature point from a target frame image captured by a camera;

obtaining feature information of at least one optical flow image feature point in a previous frame image captured by the camera in a case that the target frame image is a valid frame image, and determining, in the at least one image feature point, an image feature point corresponding to the optical flow image feature point according to feature information of the at least one image feature point;

calculating, in a frame image, a displacement distance between the optical flow image feature point in the previous frame image and the corresponding image feature point in the target frame image; and outputting the target frame image in response to determining according to the displacement distance that the target frame image is captured in a non-motion state.

Specifically, when the processor performs the operation of obtaining feature information of at least one optical flow image feature point in a previous frame image captured by the camera, and determining, in the at least one image feature point, an image feature point corresponding to the optical flow image feature point according to feature information of the at least one image feature point, the program instructions cause the processor to perform the following operation:

performing optical flow tracking on the optical flow image feature point according to the feature information of the optical flow image feature point in the previous frame image, and tracking in the target frame image according to the feature information of the at least one image feature point in the target frame image, to obtain the image feature point corresponding to the optical flow image feature point.

In this embodiment, the program instructions, when executed by the processor, cause the processor to further perform the following operation:

performing the optical flow tracking on the optical flow image feature point according to the feature information of the optical flow image feature point in the previous frame image in a case that the previous frame image captured by the camera is a valid frame image; and saving, in the storage medium, the target frame image and the feature information of the at least one image feature point in a case that the previous frame image is not a valid frame image, where the image feature point is saved as an optical flow image feature point to perform the optical flow tracking.

In an optional implementation, the program instructions, when executed by the processor, cause the processor to further perform the following operation:

deleting a valid frame image and feature information of an optical flow image feature point in the valid frame image which are currently saved, in a case that the target frame image is not a valid frame image.

Specifically, the feature information includes pixel color information or luminance information of the image feature point.

In an optional implementation, when the processor performs the operation of determining according to the displacement distance that the target frame image is captured in a non-motion state, the program instructions cause the processor to specifically perform the following operations:

calculating an average displacement distance, in the frame image, between at least some of optical flow image feature points in the previous frame image and corresponding image feature points in the target frame image; and determining that the target frame image is captured in the non-motion state in a case that the average displacement distance is less than a distance threshold.

In an optional implementation, when the processor performs the operation of determining that the target frame image is captured in the non-motion state in a case that the average displacement distance is less than a distance threshold, the program instructions cause the processor to specifically perform the following operation:

respectively calculating average displacement distances, in the frame image, between optical flow image feature points in each frame image and corresponding image feature points in a next frame image, in continuous multi-frame images that include the target frame image and that are captured by the camera, and determining that the target frame image is captured in the non-motion state in a case that all the average displacement distances between every two adjacent frame images in the continuous multi-frame images are less than the distance threshold.

In an optional implementation, when the processor performs the operation of determining according to the displacement distance that the target frame image is captured in a non-motion state, the program instructions cause the processor to specifically perform the following operations:

calculating, in the frame image, an average displacement distance between at least some of optical flow image feature points in the previous frame image and corresponding image feature points in the target frame image;

calculating a photographing displacement speed of the camera between the target frame image and the previous frame image according to the average displacement distance and a photographing time interval between the target frame image and the previous frame image; and determining that the target frame image is captured in the non-motion state in a case that the photographing displacement speed of the camera is less than a speed threshold.

In an optional implementation, when the processor performs the operation of determining that the target frame image is captured in the non-motion state in a case that the photographing displacement speed of the camera is less than a speed threshold, the program instructions cause the processor to specifically perform the following operations:

respectively calculating average displacement distances, in the frame image, between optical flow image feature points in each frame image and corresponding image feature points in a next frame image, in continuous multi-frame images that includes the target frame image and that are captured by the camera;

calculating photographing displacement speeds of the camera between every two adjacent frame images according to average displacement distances and photographing time intervals between every two adjacent frame images in the continuous multi-frame images; and determining that the target frame image is captured in the non-motion state in a case that all the photographing displacement speeds of the camera between every two adjacent frame images are less than the speed threshold.

In an optional implementation, the program instructions, when executed by the processor, cause the processor to further perform the following operation:

obtaining a quantity of image feature points extracted from the target frame image, and determining that the target frame image is a valid frame image in a case that the quantity of extracted image feature points reaches a quantity threshold.

A proportion of differential pixel points, in adjacent pixel points around the image feature point, whose pixel features are different from the feature information of the image feature point, to all the adjacent pixel points reaches a proportion threshold.

In an optional implementation, the terminal further includes:

a camera 1203, configured to capture a frame image; and a user interface 1204, configured to interact with a user.

The program instructions, when executed by the processor, cause the processor to further perform the following operation:

transmitting guidance information through the user interface in a case that the quantity of extracted image feature points does not reach the quantity threshold, where the guidance information is used for prompting a user to adjust a camera photographing location.

In an optional implementation, the program instructions, when executed by the processor, cause the processor to further perform the following operation:

calculating an image definition of the target frame image, and determining that the target frame image is a valid frame image in a case that the definition of the target frame image reaches a definition threshold.

In an optional implementation, the program instructions, when executed by the processor, cause the processor to further perform the following operation:

obtaining a quantity of image feature points extracted from the target frame image, calculating an image definition of the target frame image in a case that the quantity of extracted image feature points does not reach a quantity threshold, and determining that the target frame image is a valid frame image in a case that the definition of the target frame image reaches a definition threshold.

In an optional implementation, when the processor performs the operation of calculating an image definition of the target frame image, the program instructions cause the processor to specifically perform the following operation:

calculating an image gradient value of the target frame image, and determining the image definition of the target frame image according to the image gradient value.

In an optional implementation, the program instructions, when executed by the processor, cause the processor to further perform the following operation:

calculating a centroid location of the target frame image according to a location of the extracted image feature point in the target frame image, and determining that the target frame image is a valid frame image in a case that the centroid location is in a central region of the target frame image.

In an optional implementation, when the processor performs the operation of calculating a centroid location of the target frame image according to a location of the extracted image feature point in the target frame image, the program instructions cause the processor to specifically perform the following operations:

determining a plurality of grid sub-regions in the target frame image;

determining a grid sub-region in which each image feature point is located according to the location of the extracted image feature point in the target frame image; and calculating the centroid location of the target frame image according to a quantity of image feature points in each of the plurality of grid sub-regions.

In an optional implementation, the program instructions, when executed by the processor, cause the processor to further perform the following operation:

transmitting guidance information through the user interface in a case that the centroid location is not in the central region of the target frame image, where the guidance information is used for prompting a user to adjust a camera photographing location.

In an optional implementation, the terminal further includes:

a communications interface 1206, configured to communicate with an external device.

When the processor performs the operation of outputting the target frame image, the program instructions cause the processor to specifically perform the following operation:

submitting the target frame image to a server through the communications interface.

The storage medium 1201, the processor 1202, the camera 1203, the user interface 1204, and the communications interface 1205 are connected by using a bus 1206.

By implementing this embodiment of this application, the terminal can be prevented from outputting an image with a poor imaging effect, so as to provide an image with a good imaging effect for a user, improve image processing efficiency of the terminal, and increase user satisfaction.

In specific implementation, the processor 1202, the camera 1203, the user interface 1204, and the communications interface 1205 described in this embodiment of this application can perform the implementations described in the foregoing embodiments according to the embodiments of this application, or can perform related functions of the terminal described in this embodiment of this application. Details are not described herein.

Another embodiment of this application provides a storage medium. The storage medium stores a plurality of program instructions. The program instructions, when executed by a processor, cause the processor to perform the following operations: extracting at least one image feature point from a target frame image captured by a camera; obtaining a corresponding image feature point in a previous frame image captured by the camera according to feature information of the image feature point in a case that the target frame image is a valid frame image; calculating a displacement distance, in a frame image, between the image feature point in the target frame image and the corresponding image feature point in the previous frame image; and outputting the target frame image in response to determining according to the displacement distance that the target frame image is captured in a non-motion state.

The storage medium may be any internal storage unit of the terminal described in any one of the foregoing embodiments, for example, a hard disk or an internal memory. The storage medium may alternatively be an external storage device of the terminal, for example, a removable hard disk, a smart memory card (SMC), a secure digital (SD) card, or a flash card equipped on the terminal. Further, alternatively, the storage medium may include both an internal storage unit and an external storage device of the terminal. The storage medium is configured to store the program instructions and other programs and data that are required by the terminal. The storage medium may be further configured to temporarily store data that has been output or data to be output.

A person of ordinary skill in the art may understand that all or some of the processes of the methods in the embodiments may be implemented by a computer program instructing related hardware. The program may be stored in a non-volatility computer-readable storage medium. When the program runs, the processes of the methods in the embodiments may be included. Any reference to a memory, a storage, a database, or other mediums used in the embodiments provided in this application can include a non-volatile and/or volatile memory. The non-volatile memory may include a read only memory (ROM), a programmable ROM (PROM), an electrically programmable ROM (EPROM), an electrically erasable programmable ROM (EEPROM) or a flash memory. The volatile memory may include a random access memory (RAM) or an external high-speed cache memory. As a description instead of a limitation, the RAM may have multiple forms, such as a static RAM (SRAM), a dynamic RAM (DRAM), a synchronous DRAM (SDRAM), a double data rate SDRAM (DDR SDRAM), an enhanced SDRAM (ESDRAM), a Synchlink DRAM (SLDRAM), a rambus direct RAM (RDRAM), a direct rambus dynamic RAM (DRDRAM), and a rambus dynamic RAM (RDRAM).

The technical features in the foregoing embodiments may be randomly combined. For concise description, not all possible combinations of the technical features in the embodiment are described. However, the combinations of the technical features shall all be considered as falling within the scope described in this specification provided that they do not conflict with each other.

The foregoing embodiments only describe several implementations of this application, which are described specifically and in detail, and therefore cannot be construed as a limitation to the patent scope of the present disclosure. A person of ordinary skill in the art may further make variations and improvements without departing from the ideas of this application, and the variations and improvements shall fall within the protection scope of this application. Therefore, the protection scope of this application shall be subject to the protection scope of the appended claims.

What is claimed is:

1. An image processing method performed at a terminal having one or more processors and memory storing a plurality of programs to be executed by the one or more processors, the method comprising:
    extracting one or more image feature points from a target frame image captured by a camera of the terminal;
    determining a plurality of grid sub-regions in the target frame image, each grid sub-region including at least one of the extracted image feature points;
    calculating a centroid location of the target frame image according to a quantity of image feature points in each of the plurality of grid sub-regions;
    in accordance with a determination that the centroid location is in a central region of the target frame image:
        determining that the target frame image is a valid frame image;
        obtaining feature information of at least one optical flow image feature point in a frame image captured by the camera immediately preceding the target frame image;
        determining, among the one or more image feature points, an image feature point corresponding to the optical flow image feature point according to the feature information of the at least one image feature point;
        calculating a displacement between the optical flow image feature point in the frame image immediately preceding the target frame image and the corresponding image feature point in the target frame image; and
        submitting the target frame image to a remote server when the displacement indicates that the target frame image is captured in a non-motion state.

2. The image processing method according to claim 1, wherein the determining, among the one or more image feature points, an image feature point corresponding to the optical flow image feature point according to feature information of the at least one image feature point comprises:
    performing optical flow tracking on the optical flow image feature point according to the feature information of the optical flow image feature point in the frame image immediately preceding the target frame image; and
    obtain the image feature point corresponding to the optical flow image feature point according to the feature information of the one or more image feature points in the target frame image.

3. The image processing method according to claim 2, wherein the method further comprises:
    performing the optical flow tracking on the optical flow image feature point according to the feature information of the optical flow image feature point in the frame image immediately preceding the target frame image when the frame image immediately preceding the target frame image is a valid frame image; and
    saving the target frame image and the feature information of the one or more image feature points when the frame image immediately preceding the target frame image is not a valid frame image, wherein the image feature point is saved as an optical flow image feature point used for performing the optical flow tracking.

4. The image processing method according to claim 3, further comprising:
    deleting a valid frame image and feature information of an optical flow image feature point in the valid frame image which are currently saved, when the target frame image is not a valid frame image.

5. The image processing method according to claim 1, wherein the feature information comprises pixel color information or luminance information of the image feature point.

6. The image processing method according to claim 1, further comprising determining whether the target frame image is captured in the non-motion state, including:
    calculating an average displacement, in the frame image, between at least some of optical flow image feature points in the frame image immediately preceding the target frame image and corresponding image feature points in the target frame image; and
    determining that the target frame image is captured in the non-motion state when the average displacement is less than a distance threshold.

7. The image processing method according to claim 6, wherein the determining that the target frame image is captured in the non-motion state when the average displacement distance is less than the distance threshold comprises:
    respectively calculating average displacements, in the frame image, between optical flow image feature points in each frame image and corresponding image feature points in an adjacent frame image immediately following the frame image, in continuous multi-frame images that comprise the target frame image and that are captured by the camera; and
    determining that the target frame image is captured in the non-motion state when all the average displacements between every two adjacent frame images in the continuous multi-frame images are less than the displacement threshold.

8. The image processing method according to claim 1, further comprising determining whether the target frame image is captured in the non-motion state, including:
    calculating an average displacement, in the frame image, between at least some of optical flow image feature points in the frame image immediately preceding the target frame image and corresponding image feature points in the target frame image;
    calculating a photographing speed of the camera between the target frame image and the frame image immediately preceding the target frame image according to the average displacement and a photographing time interval between the target frame image and the frame image immediately preceding the target frame image; and
    determining that the target frame image is captured in the non-motion state when the photographing speed of the camera is less than a speed threshold.

9. The image processing method according to claim 8, wherein determining that the target frame image is captured in the non-motion state when the photographing speed of the camera is less than the speed threshold comprises:
- respectively calculating average displacements, in the frame image, between optical flow image feature points in each frame image and corresponding image feature points in an adjacent frame image immediately following the each frame image, in continuous multi-frame images that comprise the target frame image and that are captured by the camera;
- calculating photographing speeds of the camera between every two adjacent frame images according to average displacements and photographing time intervals between every two adjacent frame images in the continuous multi-frame images; and
- determining that the target frame image is captured in the non-motion state when all the photographing speeds of the camera between every two adjacent frame images are less than the speed threshold.

10. The image processing method according to claim 1, further comprising prior to obtaining the feature information of at least one optical flow image feature point in the frame image immediately preceding the target frame image:
- obtaining a quantity of image feature points extracted from the target frame image; and
- determining that the target frame image is a valid frame image when the quantity of extracted image feature points reaches a quantity threshold.

11. The image processing method according to claim 10, wherein a proportion of differential pixel points, in adjacent pixel points around the image feature point, whose pixel features are different from the feature information of the image feature point, to all the adjacent pixel points reaches a proportion threshold.

12. The image processing method according to claim 1, further comprising:
- prior to obtaining feature information of the at least one optical flow image feature point the frame image immediately preceding the target frame image, calculating an image clarity of the target frame image, and determining that the target frame image is a valid frame image when the image clarity of the target frame image reaches a clarity threshold.

13. The image processing method according to claim 12, further comprising:
- prior to calculating the image clarity of the target frame image, obtaining a quantity of image feature points extracted from the target frame image, calculating an image clarity of the target frame image when the quantity of extracted image feature points does not reach a quantity threshold, and determining that the target frame image is a valid frame image when the image clarity of the target frame image reaches the clarity threshold.

14. The image processing method according to claim 12, wherein calculating the image clarity of the target frame image comprises:
- calculating an image gradient value of the target frame image, and determining the image clarity of the target frame image according to the image gradient value.

15. The image processing method according to claim 1, further comprising:
- transmitting guidance information when the centroid location is not in the central region of the target frame image, wherein the guidance information is used for prompting a user to adjust a camera photographing location.

16. A terminal for image processing, comprising:
- one or more processors; and
- memory coupled to the one or more processors, the memory storing a plurality of programs that, when executed by the one or more processors, cause the terminal to perform a plurality of operations comprising:
- extracting one or more image feature points from a target frame image captured by a camera of the terminal;
- determining a plurality of grid sub-regions in the target frame image, each grid sub-region including at least one of the extracted image feature points;
- calculating a centroid location of the target frame image according to a quantity of image feature points in each of the plurality of grid sub-regions;
- in accordance with a determination that the centroid location is in a central region of the target frame image:
  - determining that the target frame image is a valid frame image;
  - obtaining feature information of at least one optical flow image feature point in a frame image captured by the camera immediately preceding the target frame image;
  - determining, among the one or more image feature points, an image feature point corresponding to the optical flow image feature point according to the feature information of the at least one image feature point;
  - calculating a displacement between the optical flow image feature point in the frame image immediately preceding the target frame image and the corresponding image feature point in the target frame image; and
  - submitting the target frame image to a remote server when the displacement indicates that the target frame image is captured in a non-motion state.

17. A non-transitory computer readable storage medium storing a plurality of machine readable instructions in connection with a terminal having one or more processors, wherein the plurality of machine readable instructions, when executed by the one or more processors, cause the terminal to perform a plurality of operations including:
- extracting one or more image feature points from a target frame image captured by a camera of the terminal;
- determining a plurality of grid sub-regions in the target frame image, each grid sub-region including at least one of the extracted image feature points;
- calculating a centroid location of the target frame image according to a quantity of image feature points in each of the plurality of grid sub-regions;
- in accordance with a determination that the centroid location is in a central region of the target frame image:
  - determining that the target frame image is a valid frame image;
  - obtaining feature information of at least one optical flow image feature point in a frame image captured by the camera immediately preceding the target frame image;
  - determining, among the one or more image feature points, an image feature point corresponding to the optical flow image feature point according to the feature information of the at least one image feature point;

calculating a displacement between the optical flow image feature point in the frame image immediately preceding the target frame image and the corresponding image feature point in the target frame image; and submitting the target frame image to a remote server when the displacement indicates that the target frame image is captured in a non-motion state.

\* \* \* \* \*